United States Patent
Manolakos et al.

(10) Patent No.: US 12,302,303 B2
(45) Date of Patent: *May 13, 2025

(54) DETERMINING TRANSMISSION CONFIGURATIONS FOR RESOURCE BLOCK GROUPS AND PRECODING RESOURCE BLOCK GROUPS

(71) Applicant: QUALCOMM Incorporated, San Diego, CA (US)

(72) Inventors: Alexandros Manolakos, Escondido, CA (US); Gabi Sarkis, San Diego, CA (US); Navaneet Reddy Danda, San Diego, CA (US); Hobin Kim, San Diego, CA (US); Hari Sankar, San Diego, CA (US); Peter Pui Lok Ang, San Diego, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 99 days.

This patent is subject to a terminal disclaimer.

(21) Appl. No.: 18/161,468

(22) Filed: Jan. 30, 2023

(65) Prior Publication Data

US 2023/0174875 A1    Jun. 8, 2023

Related U.S. Application Data

(62) Division of application No. 16/862,350, filed on Apr. 29, 2020, now Pat. No. 11,570,777.

(30) Foreign Application Priority Data

May 3, 2019  (GR) .............................. 20190100196

(51) Int. Cl.
*H04L 12/28* (2006.01)
*H04W 72/0453* (2023.01)
(Continued)

(52) U.S. Cl.
CPC ... *H04W 72/0453* (2013.01); *H04W 72/0457* (2023.01); *C10G 2300/1077* (2013.01);
(Continued)

(58) Field of Classification Search
CPC .......... H04W 72/0453; H04W 72/0457; H04L 5/001
(Continued)

(56) References Cited

U.S. PATENT DOCUMENTS 10,461,908 B2   10/2019  Patel et al.
11,323,218 B2 *  5/2022  Kwak .................. H04B 7/0626
(Continued)

FOREIGN PATENT DOCUMENTS

| | | |
|---|---|---|
| CN | 109586878 A | 4/2019 |
| WO | WO-2017082988 | 5/2017 |
| WO | WO-2019031884 A1 | 2/2019 |

OTHER PUBLICATIONS

Huawei., et al., "Correction on the Size of RBG and PRG in TS38.214", 3GPP Draft, R1-1909327, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 26, 2019-Aug. 30, 2019, Aug. 17, 2019 (Aug. 17, 2019), XP051765934, 5 pages, p. 1 and sections 5.1.2.2.1, 6.1.2.2.1.

(Continued)

*Primary Examiner* — John Pezzlo
(74) *Attorney, Agent, or Firm* — Holland & Hart LLP/Qualcomm Incorporated

(57) ABSTRACT

Methods, systems, and devices for wireless communications are described Techniques described may be utilized to avoid errors caused by resource allocation calculations, which may be indicated via higher layer signaling and/or determined within DCI. A base station may transmit downlink control (Continued)

information indicating resource allocation types to avoid errors. In other cases, the UE and/or base station may designate a particular resource block group size to avoid the potential errors. The UE and/or base station may calculate a number of resource blocks groups for a bandwidth part and allocate the size of the resource block group based on the calculation. The UE and/or base station may conduct a comparison between a bandwidth part size and a resource block group size to determine whether to designate a different resource block group size to avoid the errors. Similar techniques may be utilized in allocating resources for precoding resource block groups.

30 Claims, 20 Drawing Sheets

(51) Int. Cl.
  *H04W 72/0457* (2023.01)
  *H04J 1/16* (2006.01)
(52) U.S. Cl.
  CPC ............ *C10G 2300/205* (2013.01); *C10G 2300/4081* (2013.01); *C10G 2300/44* (2013.01)
(58) Field of Classification Search
  USPC ........................................ 370/252, 329, 430
  See application file for complete search history.

(56) References Cited

U.S. PATENT DOCUMENTS

| | | | |
|---|---|---|---|
| 11,570,777 B2 | 1/2023 | Manolakos | |
| 11,632,768 B2* | 4/2023 | Choi | H04W 72/232 370/329 |
| 2013/0176952 A1* | 7/2013 | Shin | H04L 5/0098 370/329 |
| 2018/0376501 A1 | 12/2018 | John Wilson et al. | |
| 2019/0159182 A1* | 5/2019 | Ranta-Aho | H04W 16/12 |
| 2019/0246404 A1* | 8/2019 | Zhang | H04W 72/53 |
| 2019/0261331 A1 | 8/2019 | Guthmann et al. | |
| 2019/0261425 A1* | 8/2019 | Park | H04W 76/27 |
| 2019/0274032 A1 | 9/2019 | Chatterjee et al. | |
| 2020/0163088 A1 | 5/2020 | Ji et al. | |
| 2020/0235894 A1* | 7/2020 | Takeda | H04L 5/0041 |
| 2021/0037505 A1 | 2/2021 | Kim et al. | |
| 2021/0203468 A1* | 7/2021 | Yi | H04W 72/0453 |

OTHER PUBLICATIONS

International Search Report and Written Opinion—PCT/US2020/030716—ISA/EPO—Aug. 17, 2020.

International Preliminary Report on Patentability—PCT/US2020/030716 The International Bureau of WIPO—Geneva, Switzerland, Nov. 18, 2021.

Nokia., et al., "On Remaining Details of BWPs", 3GPP Draft, R1-1800552, On Remaining Details of BWPs NOK, 3rd Generation Partnership Project (3GPP), Mobile Competence Centre, 650, Route Des Lucioles, F-06921 Sophia-Antipolis Cedex, France, vol. RAN WG1, No. Vancouver, Canada, Jan. 22, 2018-Jan. 26, 2018, Jan. 12, 2018 (Jan. 12, 2018), XP051384384, 8 pages, section 2.4.

Qualcomm Incorporated: "Maintenance for PRB Bundling for DL" 3GPP Draft, R1-1800856, 3rd Generation Partnership Project (3GPP), Mobile Competence Centre, 650, Route Des Lucioles, F-06921 Sophia-Antipolis Cedex, France, vol. RAN WG1, No. Vancouver, Canada, Jan. 22, 2018-Jan. 26, 2018, Jan. 13, 2018 (Jan. 13, 2018), XP051385128, 4 pages, section 2.

* cited by examiner

DETERMINING TRANSMISSION CONFIGURATIONS FOR RESOURCE BLOCK GROUPS AND PRECODING RESOURCE BLOCK GROUPS

CROSS REFERENCE

The present Application for Patent is a divisional of U.S. patent application Ser. No. 16/852,350 filed Apr. 29, 2020, entitled "DETERMINING TRANSMISSION CONFIGURATIONS FOR RESOURCE BLOCK GROUPS AND PRECODING RESOURCE BLOCK GROUPS," which also claims the benefit of Greece Provisional Patent Application No. 20190100196 by Manolakos et al., entitled "DETERMINING TRANSMISSION CONFIGURATIONS FOR RESOURCE BLOCK GROUPS AND PRECODING RESOURCE BLOCK GROUPS," filed May 3, 2019, assigned to the assignee hereof, and expressly incorporated by reference in its entirety herein.

BACKGROUND

The following relates generally to wireless communications, and more specifically to determining transmission configurations for resource block groups and precoding resource block groups.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, a UE or a base station may determine allocations of resource structures in particular frequencies or frequency bands. In some cases, the resource structures may be referred to as resource blocks. The UE or base station may determine subsets of contiguous resource blocks, which may be referred to as bandwidth parts, to identify where certain information may be transmitted. In some cases, when identifying resource blocks of a bandwidth part, the device may identify conflicting information, which may cause transmission and/or reception errors.

SUMMARY

The described techniques relate to improved methods, systems, devices, and apparatuses that support determining transmission configurations for resource block groups and precoding resource block groups. Generally, the described techniques provide processes for avoiding conditions which may cause transmission or reception errors due to conflicting or incorrect resource block characteristics. In some cases, a base station may transmit downlink control information, which indicates resource allocation types to avoid the potential errors. In other cases, the UE and/or base station may designate a particular resource block group size to avoid the potential errors. In these cases, the UE and/or base station may calculate a number of resource blocks groups for a bandwidth part and allocate the size of the resource block group based on the calculation. In the same or different cases, the UE and/or base station may conduct a comparison between a bandwidth part size and a resource block group size to determine whether to designate a different resource block group size to avoid the potential errors.

The described techniques may be similarly utilized to avoid potential errors based on precoding resource block groups. For example, a base station may transmit downlink control information which indicates resource allocation types to avoid the potential errors caused by precoding resource block group size determinations. In another example, the UE and/or base station may designate a particular precoding resource block group size to avoid the potential errors. In these cases, the UE and/or base station may calculate a number of precoding resource block groups for a bandwidth part and allocate the size of the precoding resource block group based on the calculation. In the same or different cases, the UE and/or base station may conduct a comparison between a bandwidth part size and a precoding resource block group size to determine whether to designate a particular bandwidth part size to avoid the potential errors.

A method of wireless communications is described. The method may include identifying a transmission configuration for a carrier bandwidth allocated for communications with a UE, the transmission configuration indicating a resource block group size and a bandwidth part size, designating a first resource allocation type for the transmission configuration instead of a second resource allocation type for the transmission configuration for allocating resources to the carrier bandwidth based on the bandwidth part size being less than or equal to a bandwidth part size threshold and further based on the resource block group size, and transmitting, to the UE, downlink control information indicating the first resource allocation type for the transmission configuration.

An apparatus for wireless communications is described. The apparatus may include a processor, memory in electronic communication with the processor, and instructions stored in the memory. The instructions may be executable by the processor to cause the apparatus to identify a transmission configuration for a carrier bandwidth allocated for communications with a UE, the transmission configuration indicating a resource block group size and a bandwidth part size, designate a first resource allocation type for the transmission configuration instead of a second resource allocation type for the transmission configuration for allocating resources to the carrier bandwidth based on the bandwidth part size being less than or equal to a bandwidth part size threshold and further based on the resource block group size, and transmit, to the UE, downlink control information indicating the first resource allocation type for the transmission configuration.

Another apparatus for wireless communications is described. The apparatus may include means for identifying a transmission configuration for a carrier bandwidth allocated for communications with a UE, the transmission configuration indicating a resource block group size and a bandwidth part size, designating a first resource allocation type for the transmission configuration instead of a second resource allocation type for the transmission configuration for allocating resources to the carrier bandwidth based on the bandwidth part size being less than or equal to a bandwidth part size threshold and further based on the resource block group size, and transmitting, to the UE, downlink control information indicating the first resource allocation type for the transmission configuration.

A non-transitory computer-readable medium storing code for wireless communications is described. The code may include instructions executable by a processor to identify a transmission configuration for a carrier bandwidth allocated for communications with a UE, the transmission configuration indicating a resource block group size and a bandwidth part size, designate a first resource allocation type for the transmission configuration instead of a second resource allocation type for the transmission configuration for allocating resources to the carrier bandwidth based on the bandwidth part size being less than or equal to a bandwidth part size threshold and further based on the resource block group size, and transmit, to the UE, downlink control information indicating the first resource allocation type for the transmission configuration.

In some examples of the method, apparatuses, and non-transitory computer-readable medium described herein, designating the first resource allocation type for the transmission configuration instead of the second resource allocation type for the transmission configuration for allocating resources to the carrier bandwidth may include operations, features, means, or instructions for determining that the bandwidth part size may be equal to one resource block and the resource block group size may be equal to two resource blocks.

In some examples of the method, apparatuses, and non-transitory computer-readable medium described herein, the bandwidth part size threshold may be one resource block based on the resource block group size being equal to two resource blocks.

In some examples of the method, apparatuses, and non-transitory computer-readable medium described herein, designating the first resource allocation type for the transmission configuration instead of the second resource allocation type for the transmission configuration for allocating resources to the carrier bandwidth may include operations, features, means, or instructions for determining that the bandwidth part size may be less than or equal to three resource blocks and the resource block group size may be equal to four resource blocks.

In some examples of the method, apparatuses, and non-transitory computer-readable medium described herein, the bandwidth part size threshold may be three resource blocks based on the resource block group size being equal to four resource blocks.

In some examples of the method, apparatuses, and non-transitory computer-readable medium described herein, designating the first resource allocation type for the transmission configuration instead of the second resource allocation type for the transmission configuration for allocating resources to the carrier bandwidth may include operations, features, means, or instructions for designating a type 1 resource allocation as the first resource allocation type for the transmission configuration instead of a type 0 resource allocation as the second resource allocation type for the transmission configuration.

In some examples of the method, apparatuses, and non-transitory computer-readable medium described herein, designating the first resource allocation type for the transmission configuration instead of the second resource allocation type for the transmission configuration for allocating resources to the carrier bandwidth may include operations, features, means, or instructions for designating that the bandwidth part size may be greater than or equal to the resource block group size.

In some examples of the method, apparatuses, and non-transitory computer-readable medium described herein, identifying the transmission configuration for the carrier bandwidth allocated for communications with the UE may include operations, features, means, or instructions for determining a configuration type indicating the resource block group size.

In some examples of the method, apparatuses, and non-transitory computer-readable medium described herein, identifying the transmission configuration for the carrier bandwidth allocated for communications with the UE may include operations, features, means, or instructions for identifying the transmission configuration according to the second resource allocation type to indicate the resource block group size and the bandwidth part size.

Some examples of the method, apparatuses, and non-transitory computer-readable medium described herein may further include operations, features, means, or instructions for identifying the resource block group size of a first resource block group of the carrier bandwidth as a first value based on the second resource allocation type, and identifying the resource block group size of a last resource block group of the carrier bandwidth as a second value based on the second resource allocation type, where the first resource block group and the last resource block group of the carrier bandwidth include a same resource block group and where the first value and the second value may be different.

In some examples of the method, apparatuses, and non-transitory computer-readable medium described herein, transmitting, to the UE, downlink control information indicating the first resource allocation type for the transmission configuration may include operations, features, means, or instructions for transmitting the downlink control information indicating a resource block start parameter and a number of resource blocks.

Some examples of the method, apparatuses, and non-transitory computer-readable medium described herein may further include operations, features, means, or instructions for receiving, from the UE, a transmission including resources allocated according to the first resource allocation type.

Some examples of the method, apparatuses, and non-transitory computer-readable medium described herein may further include operations, features, means, or instructions for transmitting, to the UE, a transmission including resources allocated according to the first resource allocation type.

A method of wireless communications at a first device is described. The method may include identifying a transmission configuration for a carrier bandwidth allocated for communications with a second device, the transmission configuration indicating a resource block group size and a bandwidth part size, calculating a number of resource block groups for the transmission configuration based on the resource block group size and the bandwidth part size and according to a first resource allocation type, designating the resource block group size for the transmission configuration as equal to the bandwidth part size based on the calculated number of resource block groups being equal to one, and communicating with the second device using the carrier bandwidth according to the transmission configuration.

An apparatus for wireless communications at a first device is described. The apparatus may include a processor, memory in electronic communication with the processor, and instructions stored in the memory. The instructions may be executable by the processor to cause the apparatus to identify a transmission configuration for a carrier bandwidth allocated for communications with a second device, the transmission configuration indicating a resource block group size and a bandwidth part size, calculate a number of resource block groups for the transmission configuration based on the resource block group size and the bandwidth part size and according to a first resource allocation type, designate the resource block group size for the transmission configuration as equal to the bandwidth part size based on the calculated number of resource block groups being equal to one, and communicate with the second device using the carrier bandwidth according to the transmission configuration.

Another apparatus for wireless communications at a first device is described. The apparatus may include means for identifying a transmission configuration for a carrier bandwidth allocated for communications with a second device, the transmission configuration indicating a resource block group size and a bandwidth part size, calculating a number of resource block groups for the transmission configuration based on the resource block group size and the bandwidth part size and according to a first resource allocation type, designating the resource block group size for the transmission configuration as equal to the bandwidth part size based on the calculated number of resource block groups being equal to one, and communicating with the second device using the carrier bandwidth according to the transmission configuration.

A non-transitory computer-readable medium storing code for wireless communications at a first device is described. The code may include instructions executable by a processor to identify a transmission configuration for a carrier bandwidth allocated for communications with a second device, the transmission configuration indicating a resource block group size and a bandwidth part size, calculate a number of resource block groups for the transmission configuration based on the resource block group size and the bandwidth part size and according to a first resource allocation type, designate the resource block group size for the transmission configuration as equal to the bandwidth part size based on the calculated number of resource block groups being equal to one, and communicate with the second device using the carrier bandwidth according to the transmission configuration.

In some examples of the method, apparatuses, and non-transitory computer-readable medium described herein, calculating the number of resource block groups for the transmission configuration further may include operations, features, means, or instructions for calculating the number of resource block groups for the transmission configuration based on the resource block group size, the bandwidth part size, and a start resource block of the bandwidth part, where the start resource block of the bandwidth part may be indicated by the transmission configuration.

Some examples of the method, apparatuses, and non-transitory computer-readable medium described herein may further include operations, features, means, or instructions for receiving, from a UE, a capability indication indicating that the UE may be capable of using the transmission configuration.

In some examples of the method, apparatuses, and non-transitory computer-readable medium described herein, identifying the transmission configuration for the carrier bandwidth allocated for communications with the second device may include operations, features, means, or instructions for identifying the transmission configuration according to a resource allocation type to indicate the resource block group size and the bandwidth part size.

Some examples of the method, apparatuses, and non-transitory computer-readable medium described herein may further include operations, features, means, or instructions for identifying the resource block group size of a first resource block group of the carrier bandwidth as a first value based on a resource allocation type, and identifying the resource block group size of a last resource block group of the carrier bandwidth as a second value based on the resource allocation type, where the first resource block group and the last resource block group of the carrier bandwidth include a same resource block group and where the first value and the second value may be different.

In some examples of the method, apparatuses, and non-transitory computer-readable medium described herein, communicating with the second device using the carrier bandwidth according to the transmission configuration may include operations, features, means, or instructions for transmitting, to a UE, a transmission including resources allocated using the designated resource block group size.

In some examples of the method, apparatuses, and non-transitory computer-readable medium described herein, communicating with the second device using the carrier bandwidth according to the transmission configuration may include operations, features, means, or instructions for transmitting, to a base station, a transmission including resources allocated using the designated resource block group size.

In some examples of the method, apparatuses, and non-transitory computer-readable medium described herein, communicating with the second device using the carrier bandwidth according to the transmission configuration may include operations, features, means, or instructions for receiving, at a UE, a transmission including resources allocated using the designated resource block group size, and decoding the transmission based on the designated resource block group size.

A method of wireless communications at a first device is described. The method may include identifying a transmission configuration for a carrier bandwidth allocated for communications with a second device, the transmission configuration indicating a resource block group size and a bandwidth part size, determining whether a sum of the bandwidth part size and a start resource block of the bandwidth part of the carrier bandwidth modulo the resource block group size is less than or equal to the resource block group size, designating the resource block group size for the transmission configuration as equal to the bandwidth part size based on the determining, and communicating with the second device using the carrier bandwidth according to the transmission configuration.

An apparatus for wireless communications at a first device is described. The apparatus may include a processor, memory in electronic communication with the processor, and instructions stored in the memory. The instructions may be executable by the processor to cause the apparatus to identify a transmission configuration for a carrier bandwidth allocated for communications with a second device, the transmission configuration indicating a resource block group size and a bandwidth part size, determine whether a sum of the bandwidth part size and a start resource block of the bandwidth part of the carrier bandwidth modulo the resource block group size is less than or equal to the resource block group size, designate the resource block group size for the transmission configuration as equal to the bandwidth part size based on the determining, and communicate with the second device using the carrier bandwidth according to the transmission configuration.

Another apparatus for wireless communications at a first device is described. The apparatus may include means for identifying a transmission configuration for a carrier bandwidth allocated for communications with a second device, the transmission configuration indicating a resource block group size and a bandwidth part size, determining whether a sum of the bandwidth part size and a start resource block of the bandwidth part of the carrier bandwidth modulo the resource block group size is less than or equal to the resource block group size, designating the resource block group size for the transmission configuration as equal to the bandwidth part size based on the determining, and communicating with the second device using the carrier bandwidth according to the transmission configuration.

A non-transitory computer-readable medium storing code for wireless communications at a first device is described. The code may include instructions executable by a processor to identify a transmission configuration for a carrier bandwidth allocated for communications with a second device, the transmission configuration indicating a resource block group size and a bandwidth part size, determine whether a sum of the bandwidth part size and a start resource block of the bandwidth part of the carrier bandwidth modulo the resource block group size is less than or equal to the resource block group size, designate the resource block group size for the transmission configuration as equal to the bandwidth part size based on the determining, and communicate with the second device using the carrier bandwidth according to the transmission configuration.

In some examples of the method, apparatuses, and non-transitory computer-readable medium described herein, the start resource block of the bandwidth part may be indicated by the transmission configuration.

Some examples of the method, apparatuses, and non-transitory computer-readable medium described herein may further include operations, features, means, or instructions for receiving, from a UE, a capability indication indicating that the UE may be capable of using the transmission configuration.

In some examples of the method, apparatuses, and non-transitory computer-readable medium described herein, identifying the transmission configuration for the carrier bandwidth allocated for communications with the receiving may include operations, features, means, or instructions for identifying the transmission configuration according to a resource allocation type to indicate the resource block group size and the bandwidth part size.

Some examples of the method, apparatuses, and non-transitory computer-readable medium described herein may further include operations, features, means, or instructions for identifying the resource block group size of a first resource block group of the carrier bandwidth as a first value based on a resource allocation type, and identifying the resource block group size of a last resource block group of the carrier bandwidth as a second value based on the resource allocation type, where the first resource block group and the last resource block group of the carrier bandwidth include a same resource block group and where the first value and the second value may be different.

In some examples of the method, apparatuses, and non-transitory computer-readable medium described herein, communicating with the second device using the carrier bandwidth according to the transmission configuration may include operations, features, means, or instructions for transmitting, to a UE, a transmission including resources allocated using the designated resource block group size.

In some examples of the method, apparatuses, and non-transitory computer-readable medium described herein, communicating with the second device using the carrier bandwidth according to the transmission configuration may include operations, features, means, or instructions for transmitting, to a base station, a transmission including resources allocated using the designated resource block group size.

In some examples of the method, apparatuses, and non-transitory computer-readable medium described herein, communicating with the second device using the carrier bandwidth according to the transmission configuration may include operations, features, means, or instructions for receiving, at a UE, a transmission including resources allocated using the designated resource block group size, and decoding the transmission based on the designated resource block group size.

A method of wireless communications is described. The method may include identifying a transmission configuration for a carrier bandwidth allocated for communications with a UE, the transmission configuration indicating a bandwidth part size, designating a first resource allocation type for the transmission configuration instead of a second resource allocation type for the transmission configuration for allocating resources to the carrier bandwidth based on the bandwidth part size being less than or equal to a bandwidth part size threshold, and transmitting, to the UE, downlink control information indicating the first resource allocation type for the transmission configuration.

An apparatus for wireless communications is described. The apparatus may include a processor, memory in electronic communication with the processor, and instructions stored in the memory. The instructions may be executable by the processor to cause the apparatus to identify a transmission configuration for a carrier bandwidth allocated for communications with a UE, the transmission configuration indicating a bandwidth part size, designate a first resource allocation type for the transmission configuration instead of a second resource allocation type for the transmission configuration for allocating resources to the carrier bandwidth based on the bandwidth part size being less than or equal to a bandwidth part size threshold, and transmit, to the UE, downlink control information indicating the first resource allocation type for the transmission configuration.

Another apparatus for wireless communications is described. The apparatus may include means for identifying a transmission configuration for a carrier bandwidth allocated for communications with a UE, the transmission configuration indicating a bandwidth part size, designating a first resource allocation type for the transmission configuration instead of a second resource allocation type for the transmission configuration for allocating resources to the carrier bandwidth based on the bandwidth part size being less than or equal to a bandwidth part size threshold, and transmitting, to the UE, downlink control information indicating the first resource allocation type for the transmission configuration.

A non-transitory computer-readable medium storing code for wireless communications is described. The code may include instructions executable by a processor to identify a transmission configuration for a carrier bandwidth allocated for communications with a UE, the transmission configuration indicating a bandwidth part size, designate a first resource allocation type for the transmission configuration instead of a second resource allocation type for the transmission configuration for allocating resources to the carrier bandwidth based on the bandwidth part size being less than or equal to a bandwidth part size threshold, and transmit, to the UE, downlink control information indicating the first resource allocation type for the transmission configuration.

In some examples of the method, apparatuses, and non-transitory computer-readable medium described herein, designating the first resource allocation type for the transmission configuration instead of the second resource allocation type for the transmission configuration for allocating resources to the carrier bandwidth may include operations, features, means, or instructions for determining that the bandwidth part size may be equal to one resource block.

In some examples of the method, apparatuses, and non-transitory computer-readable medium described herein, the bandwidth part size threshold may be one resource block.

In some examples of the method, apparatuses, and non-transitory computer-readable medium described herein, designating the first resource allocation type for the transmission configuration instead of the second resource allocation type for the transmission configuration for allocating resources to the carrier bandwidth may include operations, features, means, or instructions for determining that the bandwidth part size may be less than or equal to three resource blocks.

In some examples of the method, apparatuses, and non-transitory computer-readable medium described herein, the bandwidth part size threshold may be three resource blocks.

In some examples of the method, apparatuses, and non-transitory computer-readable medium described herein, designating the first resource allocation type for the transmission configuration instead of the second resource allocation type for the transmission configuration for allocating resources to the carrier bandwidth may include operations, features, means, or instructions for allocating resources including contiguous physical resource blocks.

In some examples of the method, apparatuses, and non-transitory computer-readable medium described herein, designating the first resource allocation type for the transmission configuration instead of the second resource allocation type for the transmission configuration for allocating resources to the carrier bandwidth may include operations, features, means, or instructions for designating a wideband precoding granularity as the first resource allocation type for the transmission configuration over a two precoding granularity and over a four precoding granularity as the second resource allocation type for the transmission configuration.

Some examples of the method, apparatuses, and non-transitory computer-readable medium described herein may further include operations, features, means, or instructions for identifying a precoding resource block group size of a first precoding resource block group of the carrier bandwidth as a first value, and identifying a precoding resource block group size of a last precoding resource block group of the carrier bandwidth as a second value, where the first precoding resource block group and the last precoding resource block group of the carrier bandwidth include a same precoding resource block group and where the first value and the second value may be different.

Some examples of the method, apparatuses, and non-transitory computer-readable medium described herein may further include operations, features, means, or instructions for receiving, from the UE, a transmission including resources allocated according to the first resource allocation type.

Some examples of the method, apparatuses, and non-transitory computer-readable medium described herein may further include operations, features, means, or instructions for transmitting, to the UE, a transmission including resources allocated according to the first resource allocation type.

A method of wireless communications at a first device is described. The method may include identifying a transmission configuration for a carrier bandwidth allocated for communications with a second device, the transmission configuration indicating a precoding resource block group size and a bandwidth part size, calculating a number of precoding resource block groups for the transmission configuration based on the precoding resource block group size and the bandwidth part size, designating the precoding resource block group size for the transmission configuration as equal to the bandwidth part size based on the calculated number of precoding resource block groups being equal to one, and communicating with the second device using the carrier bandwidth according to the transmission configuration.

An apparatus for wireless communications at a first device is described. The apparatus may include a processor, memory in electronic communication with the processor, and instructions stored in the memory. The instructions may be executable by the processor to cause the apparatus to identify a transmission configuration for a carrier bandwidth allocated for communications with a second device, the transmission configuration indicating a precoding resource block group size and a bandwidth part size, calculate a number of precoding resource block groups for the transmission configuration based on the precoding resource block group size and the bandwidth part size, designate the precoding resource block group size for the transmission configuration as equal to the bandwidth part size based on the calculated number of precoding resource block groups being equal to one, and communicate with the second device using the carrier bandwidth according to the transmission configuration.

Another apparatus for wireless communications at a first device is described. The apparatus may include means for identifying a transmission configuration for a carrier bandwidth allocated for communications with a second device, the transmission configuration indicating a precoding resource block group size and a bandwidth part size, calculating a number of precoding resource block groups for the transmission configuration based on the precoding resource block group size and the bandwidth part size, designating the precoding resource block group size for the transmission configuration as equal to the bandwidth part size based on the calculated number of precoding resource block groups being equal to one, and communicating with the second device using the carrier bandwidth according to the transmission configuration.

A non-transitory computer-readable medium storing code for wireless communications at a first device is described. The code may include instructions executable by a processor to identify a transmission configuration for a carrier bandwidth allocated for communications with a second device, the transmission configuration indicating a precoding resource block group size and a bandwidth part size, calculate a number of precoding resource block groups for the transmission configuration based on the precoding resource block group size and the bandwidth part size, designate the precoding resource block group size for the transmission configuration as equal to the bandwidth part size based on the calculated number of precoding resource block groups being equal to one, and communicate with the second device using the carrier bandwidth according to the transmission configuration.

In some examples of the method, apparatuses, and non-transitory computer-readable medium described herein, calculating the number of precoding resource block groups for the transmission configuration further may include operations, features, means, or instructions for calculating the number of precoding resource block groups for the transmission configuration based on the precoding resource block group size, the bandwidth part size, and a start precoding resource block of the bandwidth part, where the start precoding resource block of the bandwidth part may be indicated by the transmission configuration.

Some examples of the method, apparatuses, and non-transitory computer-readable medium described herein may further include operations, features, means, or instructions for receiving, from a UE, a capability indication indicating that the UE may be capable of using the transmission configuration.

Some examples of the method, apparatuses, and non-transitory computer-readable medium described herein may further include operations, features, means, or instructions for identifying the precoding resource block group size of a first precoding resource block group of the carrier bandwidth as a first value, and identifying the precoding resource block group size of a last precoding resource block group of the carrier bandwidth as a second value, where the first precoding resource block group and the last precoding resource block group of the carrier bandwidth include a same precoding resource block group and where the first value and the second value may be different.

In some examples of the method, apparatuses, and non-transitory computer-readable medium described herein, communicating with the second device using the carrier bandwidth according to the transmission configuration may include operations, features, means, or instructions for transmitting, to a UE, a transmission including resources allocated using the designated precoding resource block group size.

In some examples of the method, apparatuses, and non-transitory computer-readable medium described herein, communicating with the second device using the carrier bandwidth according to the transmission configuration may include operations, features, means, or instructions for transmitting, to a base station, a transmission including resources allocated using the designated precoding resource block group size.

In some examples of the method, apparatuses, and non-transitory computer-readable medium described herein, communicating with the second device using the carrier bandwidth according to the transmission configuration may include operations, features, means, or instructions for receiving, at a UE, a transmission including resources allocated using the designated precoding resource block group size, and decoding the transmission based on the designated precoding resource block group size.

A method of wireless communications at a first device is described. The method may include identifying a transmission configuration for a carrier bandwidth allocated for communications with a second device, the transmission configuration indicating a precoding resource block group size and a bandwidth part size, determining whether a sum of the bandwidth part size and a start bandwidth part of the carrier bandwidth modulo the precoding resource block group size is less than or equal to the precoding resource block group size, designating the precoding resource block group size for the transmission configuration as equal to the bandwidth part size based on the determining, and communicating with the second device using the carrier bandwidth according to the transmission configuration.

An apparatus for wireless communications at a first device is described. The apparatus may include a processor, memory in electronic communication with the processor, and instructions stored in the memory. The instructions may be executable by the processor to cause the apparatus to identify a transmission configuration for a carrier bandwidth allocated for communications with a second device, the transmission configuration indicating a precoding resource block group size and a bandwidth part size, determine whether a sum of the bandwidth part size and a start bandwidth part of the carrier bandwidth modulo the precoding resource block group size is less than or equal to the precoding resource block group size, designate the precoding resource block group size for the transmission configuration as equal to the bandwidth part size based on the determining, and communicate with the second device using the carrier bandwidth according to the transmission configuration.

Another apparatus for wireless communications at a first device is described. The apparatus may include means for identifying a transmission configuration for a carrier bandwidth allocated for communications with a second device, the transmission configuration indicating a precoding resource block group size and a bandwidth part size, determining whether a sum of the bandwidth part size and a start bandwidth part of the carrier bandwidth modulo the precoding resource block group size is less than or equal to the precoding resource block group size, designating the precoding resource block group size for the transmission configuration as equal to the bandwidth part size based on the determining, and communicating with the second device using the carrier bandwidth according to the transmission configuration.

A non-transitory computer-readable medium storing code for wireless communications at a first device is described. The code may include instructions executable by a processor to identify a transmission configuration for a carrier bandwidth allocated for communications with a second device, the transmission configuration indicating a precoding resource block group size and a bandwidth part size, determine whether a sum of the bandwidth part size and a start bandwidth part of the carrier bandwidth modulo the precoding resource block group size is less than or equal to the precoding resource block group size, designate the precoding resource block group size for the transmission configuration as equal to the bandwidth part size based on the determining, and communicate with the second device using the carrier bandwidth according to the transmission configuration.

In some examples of the method, apparatuses, and non-transitory computer-readable medium described herein, the start precoding resource block of the bandwidth part may be indicated by the transmission configuration.

Some examples of the method, apparatuses, and non-transitory computer-readable medium described herein may further include operations, features, means, or instructions for receiving, from a UE, a capability indication indicating that the UE may be capable of using the transmission configuration.

Some examples of the method, apparatuses, and non-transitory computer-readable medium described herein may further include operations, features, means, or instructions for identifying the precoding resource block group size of a first precoding resource block group of the carrier bandwidth as a first value, and identifying the precoding resource block group size of a last precoding resource block group of the carrier bandwidth as a second value, where the first precoding resource block group and the last precoding resource block group of the carrier bandwidth include a same precoding resource block group and where the first value and the second value may be different.

In some examples of the method, apparatuses, and non-transitory computer-readable medium described herein, communicating with the second device using the carrier bandwidth according to the transmission configuration may include operations, features, means, or instructions for transmitting, to a UE, a transmission including resources allocated using the designated precoding resource block group size.

In some examples of the method, apparatuses, and non-transitory computer-readable medium described herein, communicating with the second device using the carrier bandwidth according to the transmission configuration may include operations, features, means, or instructions for transmitting, to a base station, a transmission including resources allocated using the designated precoding resource block group size.

In some examples of the method, apparatuses, and non-transitory computer-readable medium described herein, communicating with the second device using the carrier bandwidth according to the transmission configuration may include operations, features, means, or instructions for receiving, at a UE, a transmission including resources allocated using the designated precoding resource block group size, and decoding the transmission based on the designated precoding resource block group size.

DETAILED DESCRIPTION

Figure 1:
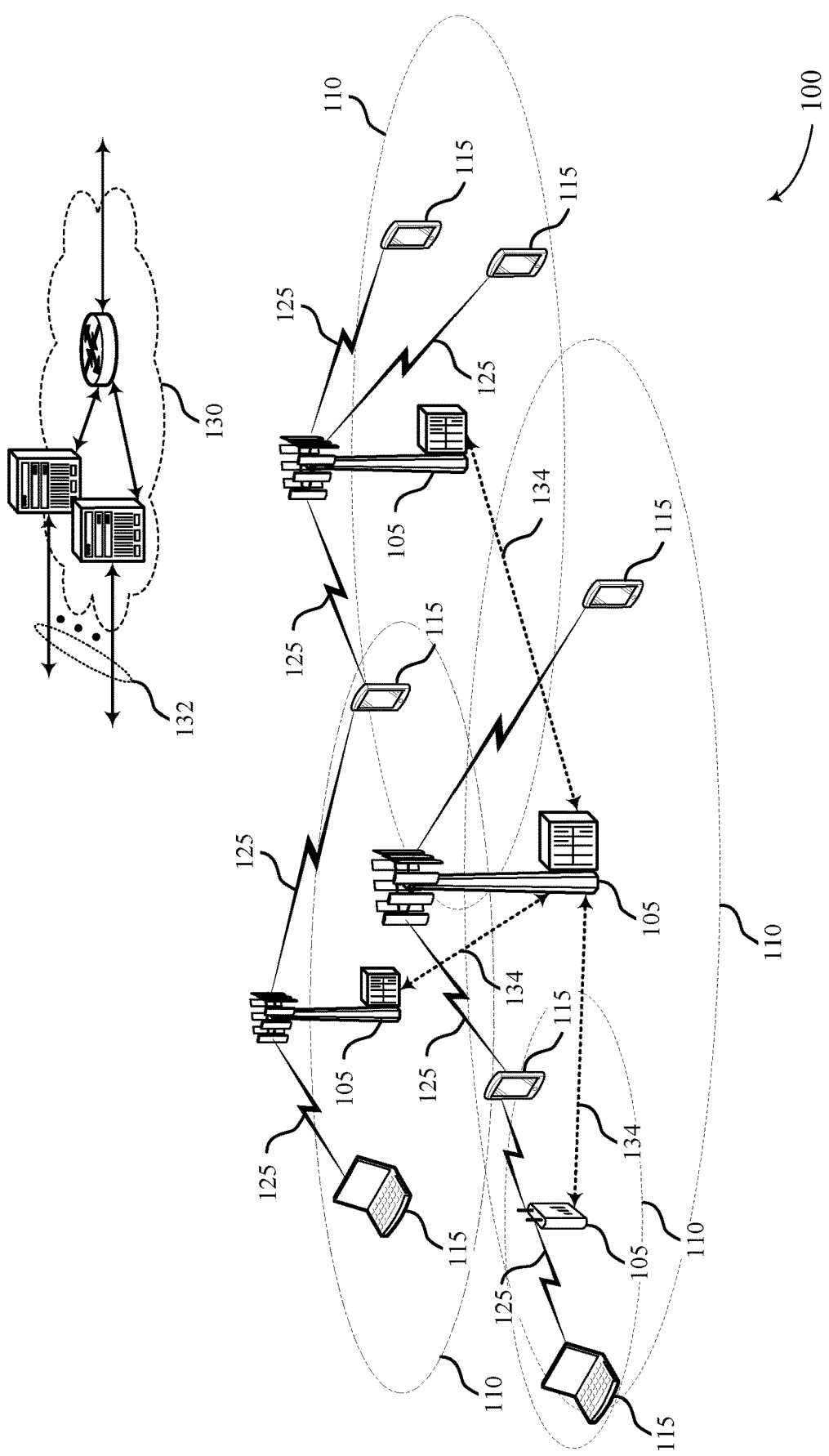
FIG. 1 illustrates an example of a system for wireless communications that supports determining transmission configurations in accordance with aspects of the present disclosure.

In some wireless communication radio access technologies, one or more devices (e.g., user equipments (UEs) and/or base stations) may allocate or determine various locations and sizes of resource structures within a frequency bandwidth, such as a carrier bandwidth. For example, a base station may allocate where various resource blocks (e.g., physical resource blocks (PRBs), common resource blocks (CRBs), virtual resource blocks (VRBs)) are located in a carrier bandwidth. In some cases, these resource block locations, sizes, and groupings may be allocated and determined with reference to a carrier bandwidth part (BWP) and a point in the carrier bandwidth (e.g., point A, where subcarrier 0 in the carrier bandwidth is centered). A bandwidth part may be a subset of contiguous common resource blocks defined within the carrier bandwidth.

Various techniques may be utilized to determine resource block allocations within a carrier bandwidth. In some cases, a type 0 resource allocation (e.g., for more granular resource allocations) may refer to a bitmap including a bit for each resource block group. A UE may receive the type 0 resource allocation (e.g., a bitmap indicated via downlink control information), and may identify which resource block groups are included in a downlink grant based on a resource block group (RBG) configuration (e.g., a configuration or indexing of RBGs) and 1's indicated by the bitmap. A type 1 resource allocation may refer to a continuous resource allocation, indicated by a starting resource block or resource block group and an ending resource block or resource block groups. In a type 0 allocation, a resource block group size of a first resource block group and a last resource block group in a bandwidth part may be determined using a designated formula. However, in some cases, for example when a bandwidth part includes a single resource block group, the designated formulas may yield different resource block group sizes for the first and last resource block groups, even though the first and last resource block groups are the same resource block groups. These conflicting results may cause errors in resource allocation by a base station and resource identification by a UE.

Further, similar techniques may be utilized to identify precoding resource block groups within various bandwidth parts in a carrier bandwidth. A UE may be configured to identify the size of the first and last precoding resource block group of a bandwidth part. If the bandwidth part includes a single precoding resource block group, then a UE may identify different sizes for the first and last precoding resource block groups, even though first and last precoding resource block group is the same precoding resource block group. These conflicting results may also cause errors in resource allocation by a base station and resource identification by a UE.

Various techniques described herein may be utilized to avoid these potential errors. In one example technique, a base station may identify a particular resource allocation (e.g., type 1 allocation) in downlink control information transmitted to a UE such that the described errors may be avoided. The base station may identify the particular resource allocation upon determining that an identified transmission configuration yields a bandwidth part size less than or equal to a bandwidth part size threshold and further based on a resource block group size yielded by the transmission configuration. Thus, rather than allocating resources according to a first allocation type, which may potentially result in the described errors, the base station instructs a UE to utilize a resource allocation which avoids the possibility of such errors. In other examples, the UE and base station may be configured to set a resource block group size equal to the bandwidth part size when the UE and base station determine that certain conditions present in a transmission configuration. These techniques may be similarly utilized to avoid the errors caused in allocation of precoding resource block groups.

Aspects of the disclosure are initially described in the context of a wireless communications system. Aspects of the disclosure are further described in the context of a wireless communications system illustrating communications between a base station and a UE, a process flow diagram illustrating a base station designated resource allocation type, a process flow diagram illustrating a resource block group size designation based on a calculation, and a process flow diagram illustrating a resource block group size designation based on a comparison. Aspects of the disclosure are further illustrated by and described with reference to apparatus diagrams, system diagrams, and flowcharts that relate to determining transmission configurations.

FIG. 1 illustrates an example of a wireless communications system 100 that supports determining transmission configurations for resource block groups and precoding resource block groups in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s = 1/30,720,000$ seconds. Time intervals of a communications resource may be organized according to radio frames each having a duration of 10 milliseconds (ms), where the frame period may be expressed as $T_f = 307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples, the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some wireless communication radio access technologies, a base station 105 may allocate different resource structures within a frequency bandwidth, such as a carrier bandwidth. In some cases, allocation of resource structures within a frequency bandwidth may be referred to as identification of a transmission configuration. In some cases, identification of a transmission configuration includes identifying a resource allocation type based on carrier bandwidth, operating conditions, UE capability, etc. In some examples, the resource allocation type may be indicated by higher layer signaling, and in some cases, base station 105 may transmit downlink signaling (e.g., downlink control information (DCI), RRC signaling etc.) that includes a grant indicating a resource allocation for a downlink or uplink transmission. DCI may include information regarding downlink scheduling assignments, uplink resource grants, transmission scheme, uplink power control, HARQ information, a MCS, and other information. The size and format of the DCI message may differ depending on the type and amount of information that is carried by the DCI, as well as factors such as bandwidth, the number of antenna ports, and duplexing mode.

DCI may indicate a resource allocation (e.g., a portion or range, such as a set of subcarriers, RBs, or RBGs) within a carrier in various ways. A type 0 resource allocation (e.g., for more granular resource allocations) may refer to a bitmap including a bit for each RBG. A UE 115 may receive the type 0 resource allocation (e.g., a bitmap indicated via DCI), and may identify which RBGs are included in the grant based on an RBG configuration (e.g., a configuration or indexing of RBGs) and 1's indicated by the bitmap. A type 1 resource allocation may refer to a continuous resource allocation, indicated by a starting RB or RBG and an ending RB or RBG. In some cases, resource allocation using type 0 or type 1 may also depend on higher layer signaling, and the DCI may indicate the allocation according to the higher layer signaling.

In a type 0 allocation, an RBG size of a first RBG and a last RBG in a bandwidth part may be determined using a formula designated by type 0 allocation, as will be described in greater detail below with reference to FIG. 2. However, in certain cases, for example when a bandwidth part includes a single RBG, the designated formulas may yield different RBG sizes for the first and last RBGs, even though the first and last RBG are the same RBGs. These conflicting results may cause errors in resource allocation by base station 105 and resource identification by UE 115.

Further, similar techniques may be utilized to identify precoding resource block groups (PRGs) within various BWPs in a carrier bandwidth. UE 115 may be configured to identify the size of the first and PRG of a BWP. If the BWP includes a single PRG, then a UE may identify different sizes for the first and last PRG based on a precoding granularity, even though first and last PRG is the same PRG. These conflicting results may also cause errors in resource allocation by base station 105 and resource identification by UE 115.

Various techniques described herein may be utilized to avoid these potential errors. These techniques are applicable to both resource allocation via higher layer signaling as well as resource allocation based on DCI. In one example technique, base station 105 may identify a particular resource allocation (e.g., downlink resource allocation type 1) in downlink control information transmitted to a UE 115 such that the described errors may be avoided. The base station 105 may identify the particular resource allocation upon determining that an identified transmission configuration yields a bandwidth part size less than or equal to a bandwidth part size threshold and further based on a resource block group size yielded by the transmission configuration. Thus, rather than allocating resources according to a second allocation type (e.g., type 0 allocation), which may potentially result in the described errors, the base station 105 instructs the UE 115 to utilize a first resource allocation type (e.g., type 1 allocation) which avoids the possibility of such errors. In other examples, the UE 115 and base station 105 may be configured to set an RBG size equal to BWP size when the UE 115 and base station 105 determine that certain conditions are present in a transmission configuration. These techniques may be similarly utilized to avoid the errors caused in allocation of precoding resource block groups.

Figure 2:
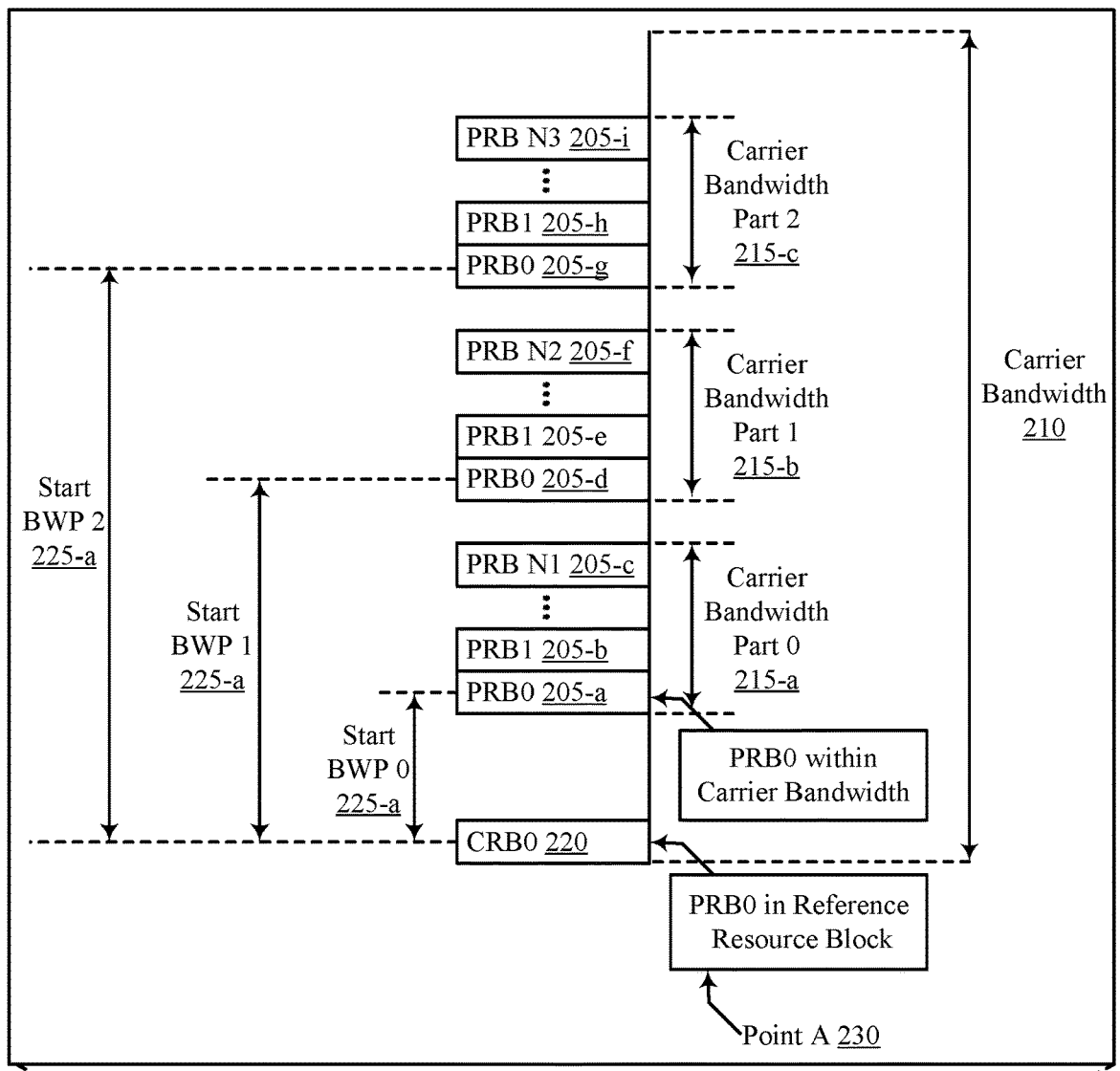
FIG. 2 illustrates an example of a system for wireless communications that supports determining transmission configurations for resource block groups and precoding groups in accordance with aspects of the present disclosure.
Figure 2:
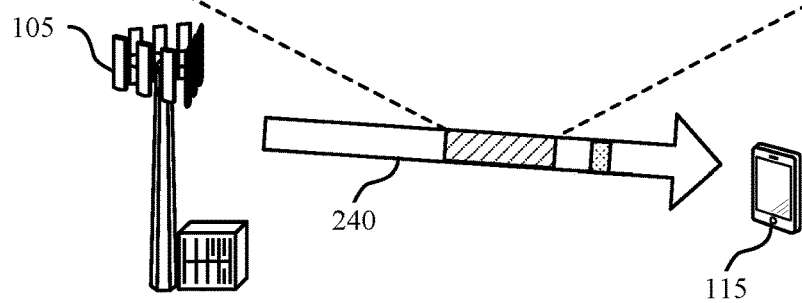

FIG. 2 illustrates an example of a wireless communications system 200 that supports determining transmission configurations for resource block groups and precoding resource block groups in accordance with aspects of the present disclosure. In some examples, wireless communications system 200 may implement aspects of wireless communication system 100. The wireless communications system includes base station 105 and UE 115. The base station 105 may communicate with the UE 115 over downlink communication link 240 and an uplink communication link. A DCI 235 in the downlink communication link 240 may schedule downlink and uplink data communications. In the illustrated example, the DCI 235 schedules communication resource structures in a carrier bandwidth 210.

The carrier bandwidth 210 includes CRBs (e.g., CRB 220), PRBs 205, VRBs (not shown), and BWPs 215. A BWP 215 includes a subset of contiguous PRBs, which may be a subset of a contiguous subset of the CRBs in the carrier bandwidth 210. Accordingly, PRBs 205 are defined within each BWP 215. Each BWP 215 may have separate configurations such as numerology, bandwidth size, frequency location, and control resource set (CORESET). Each BWP 215 may be defined with respect to a point A 230 corresponding to a center point of CRB0 220 of the carrier bandwidth 210. For example, BWP 0 215-a may be defined based on a parameter start BWP0 225-a, which indicates the first PRB (e.g., PRB0 205-a) of the BWP 0 relative to the CRB0 220. Each BWP 215 may include one or more RBGs (not shown), which may be a set of consecutive virtual resource blocks defined by a higher layer parameter. The BWPs 215 and RBGs may be allocated by base station 105 according to DCI 235, higher layer signaling, or both. As noted, the base station 105 may indicate various allocation schemes (e.g., allocation types) for allocating the resources of the carrier bandwidth 210. The allocation schemes may be selected based on factors such as granularity, type of UE communication (e.g., low latency communication), type of UE 115 (e.g., internet of things (IoT) device), etc. In some cases, the allocation schemes may be determined based on a transmission configuration, which may be indicated by higher layer signaling.

Each allocation scheme may designate a technique for determining the locations of the BWPs 215 and a number of RBGs within the BWPs 215, as well as other information. In some cases, an allocation scheme may designate a technique (e.g., formula) for determining a number of RBGs within the BWP 215. For example, in downlink resource allocation type 0, the resource block assignment information may include a bitmap indicating the RBGs allocated to the UE 115. According to downlink resource allocation type 0, the total number of RBGs ($N_{RBG}$) for a downlink BWPi of size $N_{BWPi}^{size}$ PRBs is given by $N_{RBG}=\lceil(N_{BWP,i}^{size}+N_{BWP,i}^{start}$ mod P)/P)\rceil$ where:

The size of the first RBG is $RBG_0^{size}=P-N_{BWP,i}^{start}$ mod P. (Formula 1)

However, the value of the last RBG size depends upon various conditions.

If$(N_{BWP,i}^{start}+N_{BWP,i}^{size})$mod $P>0$, the size of the last RBG is $RBG_0^{size}=(N_{BWP,i}^{start}+N_{BWP,i}^{size})$ mod P (Formula 2a)

Otherwise, the size of the last RBG is P. (Formula 2b)

Accordingly, the size of the edge RBGs (e.g., first and last RBGs of a BWP 215) may be determined using Formula 1 and Formulas 2a and 2b. However, in the case of P=2 (e.g., the RBG size is 2), $N_{BWPi}^{start}=0$, and $N_{BWP,i}^{size}=1$ (e.g., the size of the BWP 215 is one resource block), the first and last RBGs sizes may yield different results. In such cases, the first and last RBGs are the same RBG because the BWP size is one resource block.

Formula 1 may yield: $RBG_0^{size}=2-0$ mod $2=2$.

While Formula 2 may yield: $RBG_{last}^{size}=(0+1)$ mod $2=1$.

Accordingly, in this case, the first and last RBG is the same RBG, which means that the two equations provide contradicting results. The base station 105 may incur an error when allocating resources in such cases, and/or the UE 115 may incur an error when decoding a received signal in such cases.

In a first option for avoiding such errors, a base station 105 may configure UE 115 (e.g., via DCI 235) such that the UE 115 may not expect a BWP 215 size less than an RBG size (e.g., P). In other words, the base station 105 may allocate resources such that the cases where contradicting results may occur may be avoided. In order to avoid the errors, the base station 105 may consider, when identifying a transmission configuration, whether a BWP size is less than or equal to a threshold based on a resource block group size. For example, if during identification of a transmission configuration, the base station 105 determines a BWP size of 1 and an RBG size of 2, then the base station 105 may allocate resources using a type 1 allocation. In a type 1 allocation (e.g., a second resource allocation type), the formulas utilized to calculate the first and last RBG size may not be utilized (as may be the case with a type 0 allocation). Rather, in a type 1 allocation (e.g., a first resource allocation type), the DCI 235 may indicate a starting resource block and an ending resource block, where the resource blocks within a resource block group are continuous. Based on the type 1 allocation, the base station 105 may avoid errors when allocating resources for transmission, and the UE 115 may avoid errors when decoding a received transmission based on the DCI 235 indicating a type 1 allocation. Similarly, if the identified transmission configuration indicates a BWP size less than or equal to three resource blocks and the RBG size is equal to four resource blocks, then the base station 105 may allocate resources using a type 1 allocation.

In some cases, the threshold may be based on or equal to the RBG size. As noted, if the RBG size is two resource blocks and the BWP size is less than two (e.g., one resource block), then the type 1 allocation may be designated. Similarly, if the RBG size is three resource blocks and the BWP is less than or equal to three, then the type 1 allocation may be designated. Accordingly, the threshold may be set as less than or equal to the BWP size in some cases.

In a second option for avoiding such errors, the base station 105 and the UE 115 may be configured to account for the edge cases potentially causing the errors by designating the RBG size for a transmission configuration as equal to the BWP size based on a calculated number of RBGs being equal to one. In other words, if the number of RBGs in a BWP 215 is equal to one, then the RBG size is designated as equaling the BWP size. Accordingly, the base station 105 may determine an initial RBG size and BWP size based on various factors and using a type 0 resource allocation. After determining the RBG size and the BWP size, the base station 105 may calculate a number of RBGs based on the provided formula or according to the type 0 resource allocation. In other words, the base station 105 calculates the number of RBGs according to the equation designated by a type 0 allocation. If the number of RBGs is equal to one, then the base station 105 may designate (e.g., modify) the RBG size to be equal to the BWP size.

The UE 115 may receive the DCI 235 indicating a type 0 resource allocation, determine the RBG size, BWP size, and BWP start based on the transmission configuration, and calculate the number of RBGs based on the RBG size, BWP size, and the BWP start. In some cases, the RBG size, BWP size, and BWP start are indicated in DCI 235. The UE 115 may calculate the number of RBGs as being equal to one. In such cases, the UE 115 may designate the RBG size as equal to the BWP size and decode the corresponding transmission based on the designation.

In a third option for avoiding the errors, the base station 105 and the UE 115 may be configured to account for the edge cases potentially causing the errors by designating the RBG size for a transmission configuration as equal to the BWP size based on a comparison between a sum of the BWP size and a start bandwidth part modulo the RBG size, and the RBG size. The third option may be stated via the following:

if $N_{BWP,i}^{size}+(N_{BWP,i}^{start} \mod P) \leq P$, then RBG size is $N_{BWP,i}^{size}$.

Accordingly, the base station 105 may determine an initial RBG size and BWP size based on various factors and using a type 0 resource allocation. After determining the RBG size and the BWP size, the base station 105 may implement the comparison. Based on the result of the comparison, the base station 105 may designate (e.g., modify) the RBG size to be equal to the BWP size.

The UE 115 may receive the DCI 235 indicating a type 0 resource allocation, determine the RBG size and BWP size based on the transmission configuration, and implement the comparison. Based on the result of the comparison, the UE 115 may designate the RBG size as equal to the BWP size and decode the corresponding transmission based on the designation.

Similar errors may occur when determining PRG sizes within bandwidth parts 215. For example, the following procedure may be used to identify the size of the edge (e.g., first and last) PRGs in a BWP when the precoding granularity is one of the values two or four, according to.

The first PRG size is given by $P_{BWP,i}-N_{BWP,i}^{start} \mod P_{BWP,i}$. (Formula 3)

However, the value of the last PRG size depends upon various conditions. If $(N_{BWP,i}^{start}+N_{BWP,i}^{size}) \mod P_{BWP,i} \neq 0$, the last PRG size is given by $(N_{BWP,i}^{start}+N_{BWP,i}^{size}) \mod P_{BWP,i}$. (Formula 4a)

While if $(N_{BWP,i}^{start}+N_{BWP,i}^{size}) \mod P_{BWP,i}=0$, the last PRG size is $P_{BWP,i}$. (Formula 4b)

If $P_{BWP,i}=2$, $N_{BWP,i}^{start}=1$, and $N_{BWP,i}^{size}=1$, then using Formulas 3, 4a, and 4b, the size of the first PRG is: 2−0 mod 2=2, and the size of the last PRG is: (0+1)mod 2=1. However, in this case, the first and last PRG is the same PRG, which means that the two equations provide contradicting results.

In a first option for avoiding such errors, base station 105 may configure UE 115 (e.g., via DCI 235) such that the UE 115 may not expect a BWP 215 size less than a PRG size. In other words, the base station 105 may allocate resources such that the cases where contradicting results may occur may be avoided. In order to avoid the errors, the base station 105 may consider, when identifying a transmission configuration, whether a BWP size is less than or equal to a threshold based on a PRG size. For example, if during identification of a transmission configuration, the base station 105 determines a BWP size of 1 and an RBG size of 2, then the base station 105 may allocate resources using a wideband allocation (e.g., wideband precoding granularity). Accordingly, the formulas utilized to calculate the first and last PRG size may not be utilized. Accordingly, base station 105 may avoid errors when allocating resources for transmission, and the UE 115 may avoid errors when decoding a received transmission. Similarly, if the identified transmission configuration indicates a BWP size less than or equal to three resource blocks and the PRG size is equal to four resource blocks, then the base station 105 may allocate resources using wideband allocation.

In a second option for avoiding such errors, the base station 105 and the UE 115 may be configured to account for the edge cases potentially causing the errors by designating the PRG size for a transmission configuration as equal to the BWP size based on a calculated number of PRGs being equal to one. In other words, if the number of PRGs in a BWP 215 is equal to one, then the PRG size is designated as equal to the BWP size. Accordingly, the base station 105 may determine an initial PRG size and BWP size based on various factors. After determining the PRG size and the BWP size, the base station 105 may calculate a number of PRGs based on the provided formula. If the number of PRGs is equal to one, then the base station 105 may designate (e.g., modify) the PRG size to be equal to the BWP size.

The UE 115 may receive the DCI 235 indicating a particular resource allocation, determine the PRG size and BWP size based on the transmission configuration, and calculate the number of PRGs based on the PRG size, BWP size, and the start of BWP. The UE 115 may calculate the number of PRGs as being equal to one. In such cases, the UE 115 may designate the PRG size as equal to the BWP size and decode the corresponding transmission based on the designation.

In a third option for avoiding the errors, the base station 105 and the UE 115 may be configured to account for the edge cases potentially causing the errors by designating the PRG size for a transmission configuration as equal to the BWP size based on a comparison between a sum of the BWP size and a start bandwidth part modulo the PRG size, and the PRG size. The third option may be stated via the following:

if $N_{BWP,i}^{size}+(N_{BWP,i}^{start} \mod P_{BWP,i}) \leq P$, then the PRG size is $N_{BWP,i}^{size}$.

Accordingly, the base station 105 may determine an initial PRG size and BWP size based on various factors. After determining the PRG size and the BWP size, the base station 105 may implement the comparison. Based on the result of the comparison, the base station 105 may designate (e.g., modify) the PRG size to be equal to the BWP size.

The UE 115 may receive the DCI 235 indicating a particular resource allocation, determine the PRG size and BWP size based on the transmission configuration, and implement the comparison. Based on the result of the comparison, the UE 115 may designate the PRG size as equal to the BWP size and decode the corresponding transmission based on the designation. The PRG value (e.g., $P_{BWP,i}$) may be provided either by DCI, RRC, or both to the UE.

Figure 3:
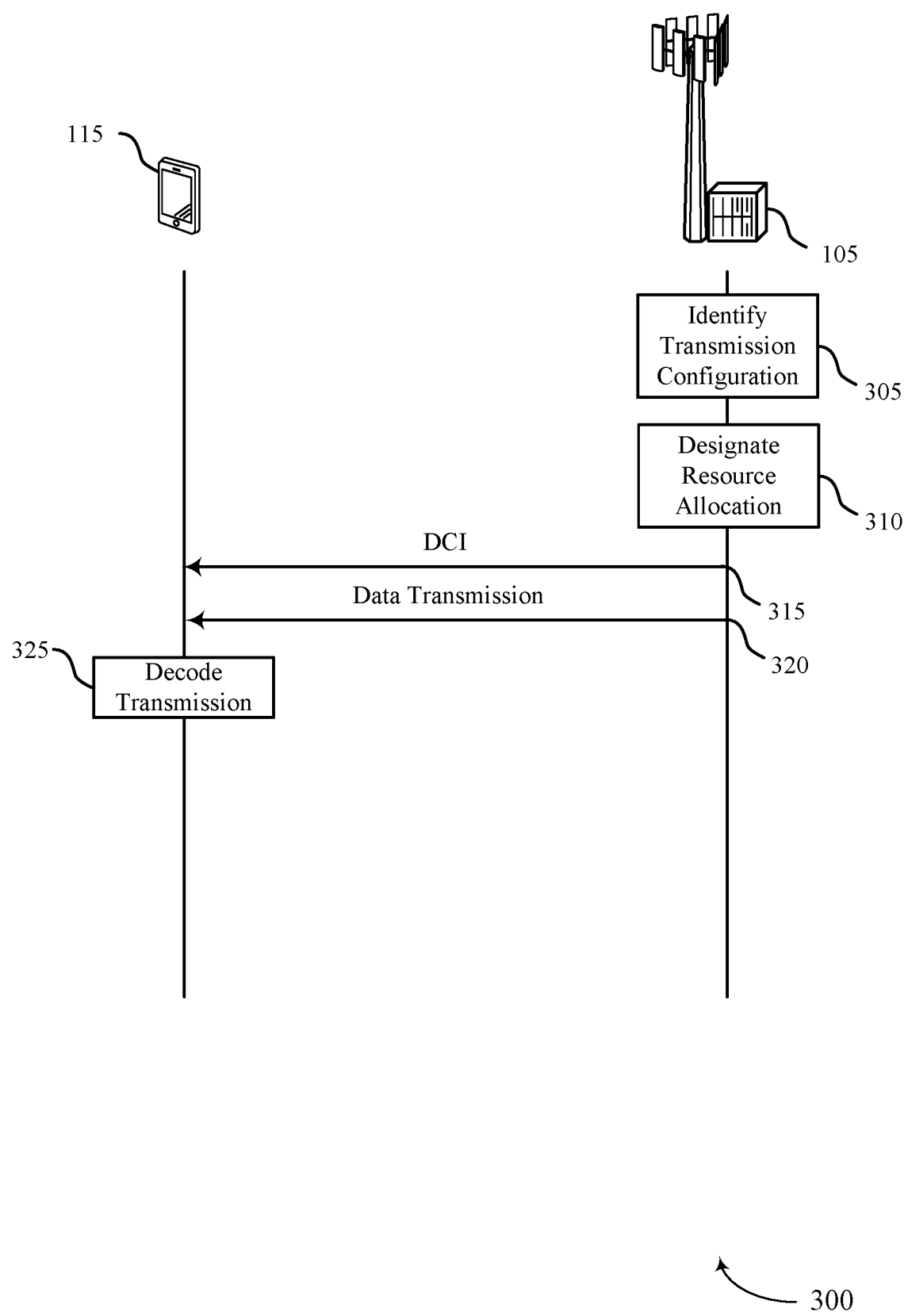
FIG. 3 illustrates an example of a process flow diagram that supports determining transmission configurations for resource block groups and precoding groups in accordance with aspects of the present disclosure.

FIG. 3 illustrates an example of a process flow diagram 300 that supports determining transmission configurations for resource block groups and precoding resource block groups in accordance with aspects of the present disclosure. In some examples, process flow diagram 300 may implement aspects of wireless communication system 100. Process flow diagram includes a base station 105 and a UE 115.

At 305, the base station 105 identifies a transmission configuration. The transmission configuration may be identified for scheduling a transmission to the UE 115 or for transmitting a downlink grant to the UE 115. In some cases, the transmission configuration may be determined based on a carrier bandwidth, UE capability, communication environment, etc. In some cases, the transmission configuration may be based on a resource allocation type indicated by higher layer signaling. The transmission configuration may indicate a resource block group size and a bandwidth part size. The resource block group size and the bandwidth part size may be determined based on a resource allocation type (e.g., allocation type 0).

At 310, the base station 105 designates a first resource allocation type for the transmission configuration instead of a second resource allocation type for the transmission configuration for allocating resources to the carrier bandwidth. The designation may be based at least in part on the bandwidth part size being less than or equal to a bandwidth part size threshold and further based at least in part on the resource block group size. For example, the base station 105 may determine that the bandwidth part size is one resource block and the resource block group size is two resource blocks. In another example, the base station 105 may determine that the bandwidth part size is less than or equal to three resource blocks and the resource block group size is equal to four resource blocks. In some cases, the first resource allocation type is a type 1 allocation, and the second resource allocation type is a type 0 allocation.

At 315, the base station 105 transmits downlink control information to the UE 115. The downlink control information may indicate the first resource allocation type for the transmission configuration. Based on a type 1 allocation, the downlink control information may indicate a resource block start parameter and a number of resource blocks.

At 320, the base station 105 transmits a data transmission to the UE 115. The data may be allocated according to the first resource allocation type. At 325, the UE 115 decodes the received data transmission based on the first resource allocation type indicated in the DCI.

The operations illustrated in FIG. 3 may be similarly used in a precoding resource block group scenario. For example, at 305 the base station 105 may identify a transmission configuration hat indicates a bandwidth part size and a precoding resource block group size. At 310, the base station 105 may designate a first resource allocation type (e.g., wideband) over a second resource allocation type (e.g., 2 or 4) based on the bandwidth part size being less than or equal to a bandwidth part size threshold. At 315, the base station 105 may transmit DCI indicating the allocation for the precoding resource block groups, and at 320, the base station 105 may transmit a data transmission, which is decoded according to the indicated allocation at 325 by the UE 115.

Figure 4:
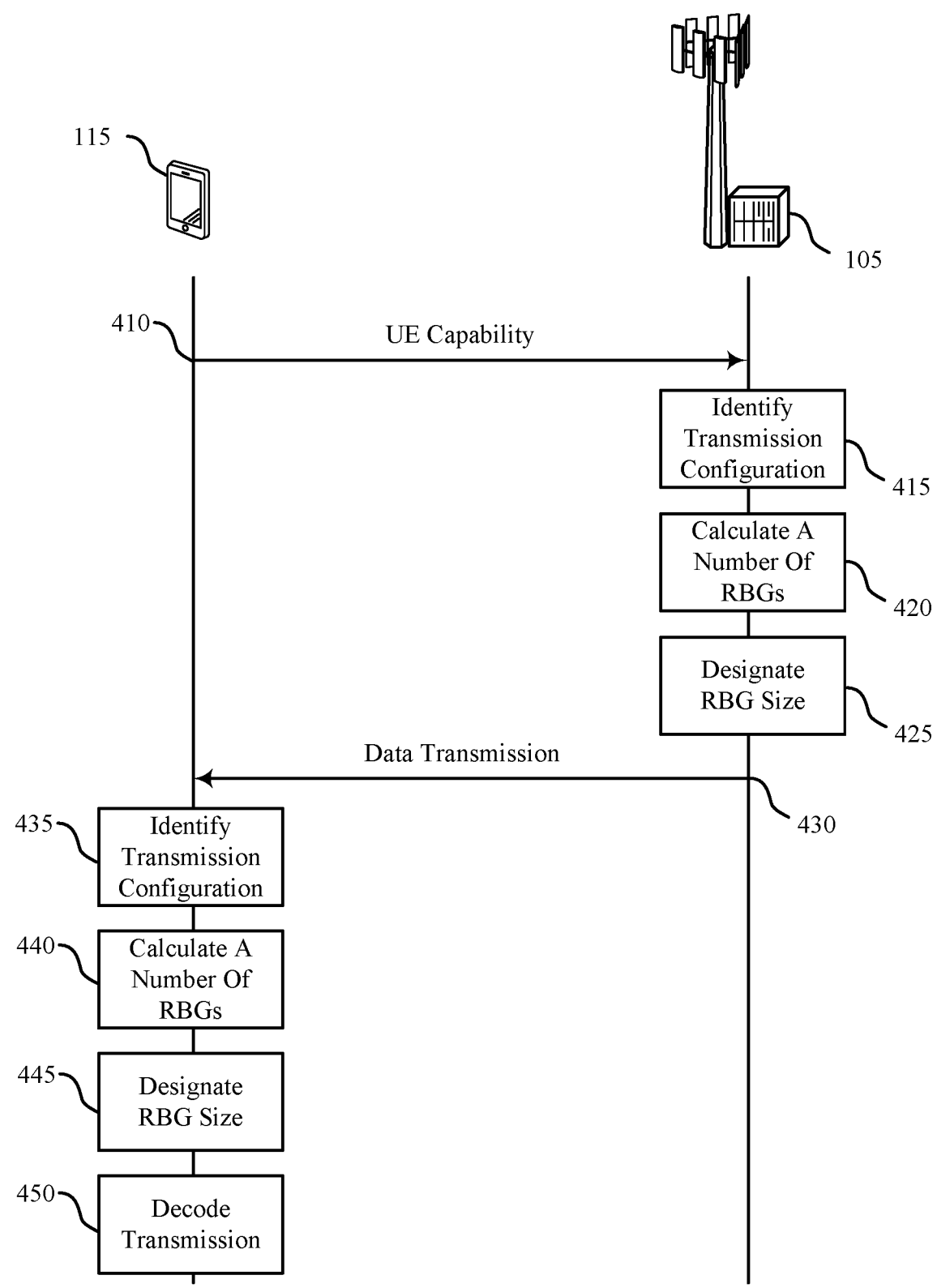
FIG. 4 illustrates an example of a process flow that supports determining transmission configurations for resource block groups and precoding groups in accordance with aspects of the present disclosure.

FIG. 4 illustrates an example of a process flow diagram 400 that supports determining transmission configurations for resource block groups and precoding resource block groups in accordance with aspects of the present disclosure. In some examples, the process flow diagram 400 may implement aspects of wireless communication system 100. The process flow diagram 400 may include a base station 105 and a UE 115.

At 410, UE 115 may transmit a UE capability indication to the base station 105. The capability indication may indicate that the UE 115 is capability of decoding messages based on a bandwidth part size designation as described herein. If the UE 115 is not capable of performing the bandwidth part size designation, then the base station 105 may implement other techniques, as described herein.

At 415, the base station 105 (e.g., a first device) identifies a transmission configuration for a carrier bandwidth allocated for communications with the UE 115 (e.g., a second device). The transmission configuration may indicate a resource block group size and a bandwidth part size. In some cases, the transmission configuration may be identified according to a type 0 allocation and based on various factors, such as a carrier bandwidth, UE capability, communication environment, etc.

At 420, the base station 105 calculates a number of resource block groups for the transmission configuration based at least in part on the indicated resource block group size and the bandwidth part size and according to a first resource allocation type. In some cases, the first resource allocation type may be type 0 resource allocation, which may provide the equation for calculating the number of resource block groups.

At 425, the base station 105 designates the resource block group size for the transmission configuration as equal to the bandwidth part size based at least on the calculated number of resource block groups being equal to one. At 430, the base station 105 communicates with the UE 115 using the carrier bandwidth and according to the transmission configuration by transmitting a data transmission to the UE 115. The data transmission may be allocated according to the designated resource block group size. In some cases, a DCI transmission may indicate the allocation type to the UE 115.

At 435, the UE 115 (e.g., a first device) may identify a transmission configuration of the received data transmission. In some cases, the identification is based on a received DCI indicating a resource allocation type. The transmission configuration may indicate a resource block group size and a bandwidth part size.

At 440, the UE 115 may calculate a number of resource block groups of the transmission configuration based at least in part on the resource block group size and the bandwidth part size and according to a first resource allocation type. For example, the UE 115 may calculate the resource block group size according to a type 0 allocation, which may designate the equation for calculating the resource block group size.

At 445, the UE 115 may designate the resource block group size of the transmission configuration as equal to the bandwidth part size based at least in part on the calculate number of resource block groups being equal to one. At 450, the UE 115 decodes the data transmission based on the designated resource block group size.

The operations illustrated in FIG. 4 may be similarly used in a precoding resource block group scenario. For example, at 405 the UE may indicate the capability of designating a precoding resource block group size based on the calculation. At 415, the base station 105 may identify the transmission configuration indicating a transmission part size and a precoding resource block group size. At 420, the base station 105 may calculate a number of precoding resource block groups for the transmission configuration based on the precoding resource block group size and the bandwidth part size. At 425, the base station 105 may designate the PRG size based on the calculated number of precoding resource block groups being equal to one, and at 430, the base station 105 may send a data transmission to the UE allocated according to the PRG size designation. The UE 115 may similarly perform the procedure to decode the transmission based on the designated PRG size.

Figure 5:
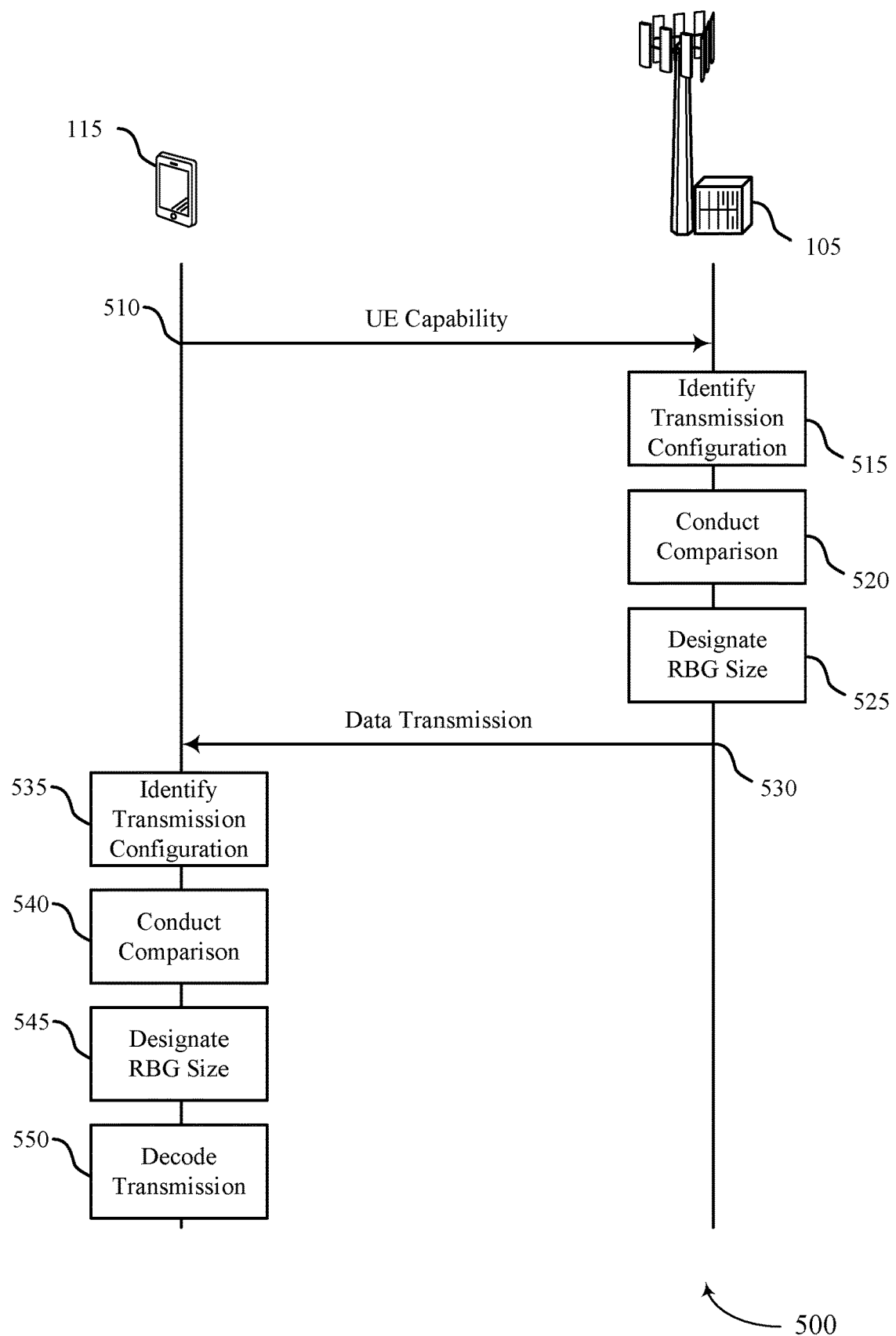
FIG. 5 illustrates an example of a process flow diagram that supports determining transmission configurations for resource block groups and precoding groups in accordance with aspects of the present disclosure.

FIG. 5 illustrates an example of a process flow diagram 500 that supports determining transmission configurations for resource block groups and precoding resource block groups in accordance with aspects of the present disclosure. In some examples, the process flow diagram 500 may implement aspects of wireless communication system 100. The process flow diagram 500 may include a base station 105 and a UE 115.

At 510, UE 115 may transmit a UE capability indication to the base station 105. The capability indication may indicate that the UE 115 is capable of decoding messages based on a bandwidth part size designation as described herein. If the UE 115 is not capable of performing the bandwidth part size designation, then the base station 105 may implement other techniques, as described herein.

At 515, the base station 105 (e.g., a first device) identifies a transmission configuration for a carrier bandwidth allocated for communications with the UE 115 (e.g., a second device). The transmission configuration may indicate a resource block group size and a bandwidth part size. In some cases, the transmission configuration may be identified according to a type 0 allocation and based on various factors, such as a carrier bandwidth, UE capability, communication environment, etc.

At 520, the base station 105 conducts a comparison to determine whether a sum of the identified bandwidth part size and a start bandwidth part of the carrier bandwidth modulo the resource block group size is less than or equal to the resource block group size.

At 525, the base station 105 designates the resource block group size for the transmission configuration as equal to the bandwidth part size based at least on the determining. At 530, the base station 105 communicates with the UE 115 using the carrier bandwidth and according to the transmission configuration by transmitting a data transmission to the UE 115. The data transmission may be allocated according to the designated resource block group size. In some cases, a DCI transmission may indicate the allocation type to the UE 115.

At 535, the UE 115 (e.g., a first device) may identify a transmission configuration of the received data transmission. In some cases, the identification is based on a received DCI indicating a resource allocation type. The transmission configuration may indicate a resource block group size and a bandwidth part size.

At 540, the UE 115 may conduct a comparison to determine whether a sum of the identified bandwidth part size and a start bandwidth part of the carrier bandwidth modulo the resource block group size is less than or equal to the resource block group size.

At 545, the UE 115 may designate the resource block group size of the transmission configuration as equal to the bandwidth part size based at least on the determining. At 550, the UE 115 decodes the data transmission based on the designated resource block group size.

The operations illustrated in FIG. 5 may be similarly used in a precoding resource block group scenario. For example, at 505 the UE may indicate the capability of designating a precoding resource block group size based on the comparison. At 515, the base station 105 may identify the transmission configuration indicating a transmission part size and a precoding resource block group size. At 520, the base station 105 may conduct a comparison to determine whether a sum of the bandwidth part size and start bandwidth part of the carrier bandwidth modulo the precoding resource block group size is less than or equal to the precoding resource block group size. At 525, the base station 105 may designate the PRG size based on the determining, and at 530, the base station 105 may send a data transmission to the UE allocated according to the PRG size designation. The UE 115 may similarly perform the procedure to decode the transmission based on the designated PRG size.

Figure 6:
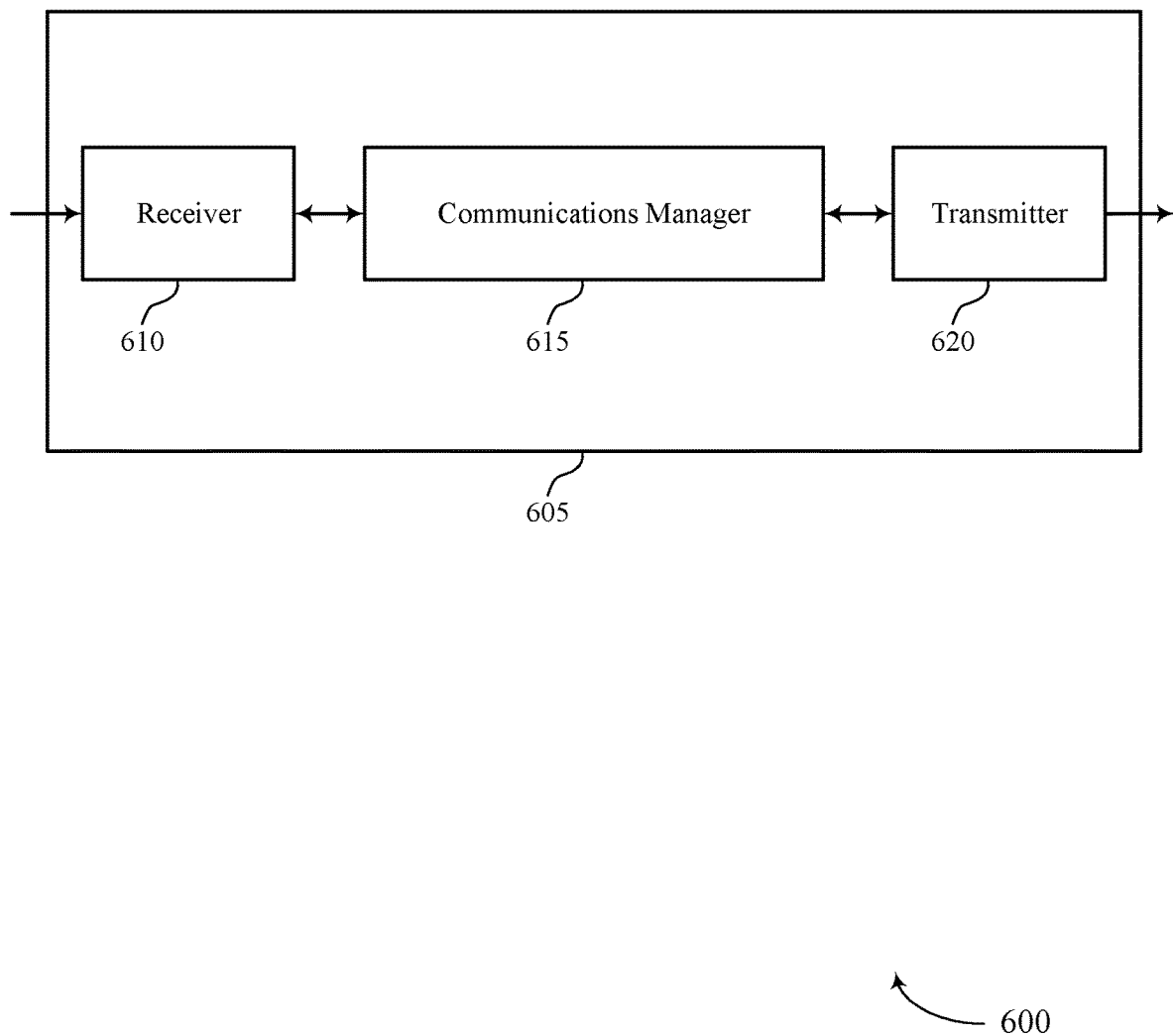
FIGS. 6 and 7 show block diagrams of devices that support determining transmission configurations for resource block groups and precoding resource block groups in accordance with aspects of the present disclosure.

FIG. 6 shows a block diagram 600 of a device 605 that supports determining transmission configurations for resource block groups and precoding resource block groups in accordance with aspects of the present disclosure. The device 605 may be an example of aspects of a UE 115 or base station 105 as described herein. The device 605 may include a receiver 610, a communications manager 615, and a transmitter 620. The device 605 may also include a processor. Each of these components may be in communication with one another (e.g., via one or more buses).

Receiver 610 may receive information such as packets, user data, or control information associated with various information channels (e.g., control channels, data channels, and information related to determining transmission configurations, etc.). Information may be passed on to other components of the device 605. The receiver 610 may be an example of aspects of the transceiver 920 or 1020 as described with reference to FIGS. 9 and 10. The receiver 610 may utilize a single antenna or a set of antennas.

The communications manager 615 may identify a transmission configuration for a carrier bandwidth allocated for communications with a second device, the transmission configuration indicating a resource block group size and a bandwidth part size, calculate a number of resource block groups for the transmission configuration based on the resource block group size and the bandwidth part size and according to a first resource allocation type, designate the resource block group size for the transmission configuration as equal to the bandwidth part size based on the calculated number of resource block groups being equal to one, and communicate with the second device using the carrier bandwidth according to the transmission configuration. The communications manager 615 may also identify a transmission configuration for a carrier bandwidth allocated for communications with a second device, the transmission configuration indicating a resource block group size and a bandwidth part size, determine whether a sum of the bandwidth part size and a start bandwidth part of the carrier bandwidth modulo the resource block group size is less than or equal to the resource block group size, designate the resource block group size for the transmission configuration as equal to the bandwidth part size based on the determining, and communicate with the second device using the carrier bandwidth according to the transmission configuration. The communications manager 615 may also identify a transmission configuration for a carrier bandwidth allocated for communications with a second device, the transmission configuration indicating a precoding resource block group size and a bandwidth part size, calculate a number of precoding resource block groups for the transmission configuration based on the precoding resource block group size and the bandwidth part size, designate the precoding resource block group size for the transmission configuration as equal to the bandwidth part size based on the calculated number of precoding resource block groups being equal to one, and communicate with the second device using the carrier bandwidth according to the transmission configuration. The communications manager 615 may also identify a transmission configuration for a carrier bandwidth allocated for communications with a second device, the transmission configuration indicating a precoding resource block group size and a bandwidth part size, determine whether a sum of the bandwidth part size and a start bandwidth part of the carrier bandwidth modulo the precoding resource block group size is less than or equal to the precoding resource block group size, designate the precoding resource block group size for the transmission configuration as equal to the bandwidth part size based on the determining, and communicate with the second device using the carrier bandwidth according to the transmission configuration. The communications manager 615 may be an example of aspects of the communications manager 910 or 1010 as described herein.

One implementation includes identifying a transmission configuration for a carrier bandwidth allocated for communications with a second device, the transmission configuration indicating a resource block group size and a bandwidth part size, calculating a number of resource block groups for the transmission configuration based at least in part on the resource block group size and the bandwidth part size and according to a first resource allocation type, designating the resource block group size for the transmission configuration as equal to the bandwidth part size based at least in part on the calculated number of resource block groups being equal to one, and communicating with the second device using the carrier bandwidth according to the transmission configuration. The actions performed by the communications manager 615 as described may be implemented to realize one or more potential advantages in a UE and a base station. This implementation may allow to save power and increase battery live by avoiding potential allocation calculation errors. These errors may be handled in different ways according to UE configurations, base station configurations, carrier configurations, etc., but the implementation allows the UE and base station to avoid the errors, and thus saving power and increasing battery live by avoiding error handling.

One implementation includes identifying a transmission configuration for a carrier bandwidth allocated for communications with a second device, the transmission configuration indicating a resource block group size and a bandwidth part size, determining whether a sum of the bandwidth part size and a start bandwidth part of the carrier bandwidth modulo the resource block group size is less than or equal to the resource block group size, designating the resource block group size for the transmission configuration as equal to the bandwidth part size based at least in part on the determining, and communicating with the second device using the carrier bandwidth according to the transmission configuration. The actions performed by the communications manager 615 as described may be implemented to realize one or more potential advantages in a UE and a base station. This implementation may allow to save power and increase battery live by avoiding potential allocation calculation errors. These errors may be handled in different ways according to UE configurations, base station configurations, carrier configurations, etc., but the implementation allows the UE and base station to avoid the errors, and thus saving power and increasing battery live by avoiding error handling.

One implementation includes identifying a transmission configuration for a carrier bandwidth allocated for communications with a second device, the transmission configuration indicating a precoding resource block group size and a bandwidth part size, calculating a number of precoding resource block groups for the transmission configuration based at least in part on the precoding resource block group size and the bandwidth part size, designating the precoding resource block group size for the transmission configuration as equal to the bandwidth part size based at least in part on the calculated number of precoding resource block groups being equal to one, and communicating with the second device using the carrier bandwidth according to the transmission configuration. The actions performed by the communications manager 615 as described may be implemented to realize one or more potential advantages in a UE and a base station. This implementation may allow to save power and increase battery live by avoiding potential allocation calculation errors. These errors may be handled in different ways according to UE configurations, base station configurations, carrier configurations, etc., but the implementation allows the UE and base station to avoid the errors, and thus saving power and increasing battery live by avoiding error handling.

One implementation includes identifying a transmission configuration for a carrier bandwidth allocated for communications with a second device, the transmission configuration indicating a precoding resource block group size and a bandwidth part size, determining whether a sum of the bandwidth part size and a start bandwidth part of the carrier bandwidth modulo the precoding resource block group size is less than or equal to the precoding resource block group size, designating the precoding resource block group size for the transmission configuration as equal to the bandwidth part size based at least in part on the determining, and communicating with the second device using the carrier bandwidth according to the transmission configuration. The actions performed by the communications manager 615 as described may be implemented to realize one or more potential advantages in a UE and a base station. This implementation may allow to save power and increase battery live by avoiding potential allocation calculation errors. These errors may be handled in different ways according to UE configurations, base station configurations, carrier configurations, etc., but the implementation allows the UE and base station to avoid the errors, and thus saving power and increasing battery live by avoiding error handling.

Based on designating the resource block group size by the base station and the UE, the processing components may avoid wasting processing power performing calculations that may cause potential errors, handling errors, etc. Based on the allocation of the resources, the processor of the UE or base station may turn on one or more processing units for receiving a transmission or allocating a transmission, increase a processing clock, or a similar mechanism within the UE or base station. As such, when the data transmission is received or a being allocated for transmission, the processor may be ready to check the potential error conditions, and designate the resource block group size to avoid the calculations that may cause errors which may increase processing efficiency by avoiding potential errors.

Based on designating the precoding resource block group size by the base station and the UE, the processing components may avoid wasting processing power performing calculations that may cause potential errors, handling errors, etc. Based on the allocation of the resources, the processor of the UE or base station may turn on one or more processing units for receiving or transmitting a transmission, increase a processing clock, or a similar mechanism within the UE or base station. As such, when the data transmission is received or being allocated for transmission, the processor may be ready to check the potential error conditions, and designate the resource block group size to avoid the calculations that may cause errors which may increase processing efficiency by avoiding potential errors.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 620 may transmit signals generated by other components of the device 605. In some examples, the transmitter 620 may be collocated with a receiver 610 in a transceiver module. For example, the transmitter 620 may be an example of aspects of the transceiver 920 or 1020 as described with reference to FIGS. 9 and 10. The transmitter 620 may utilize a single antenna or a set of antennas.

Figure 7:
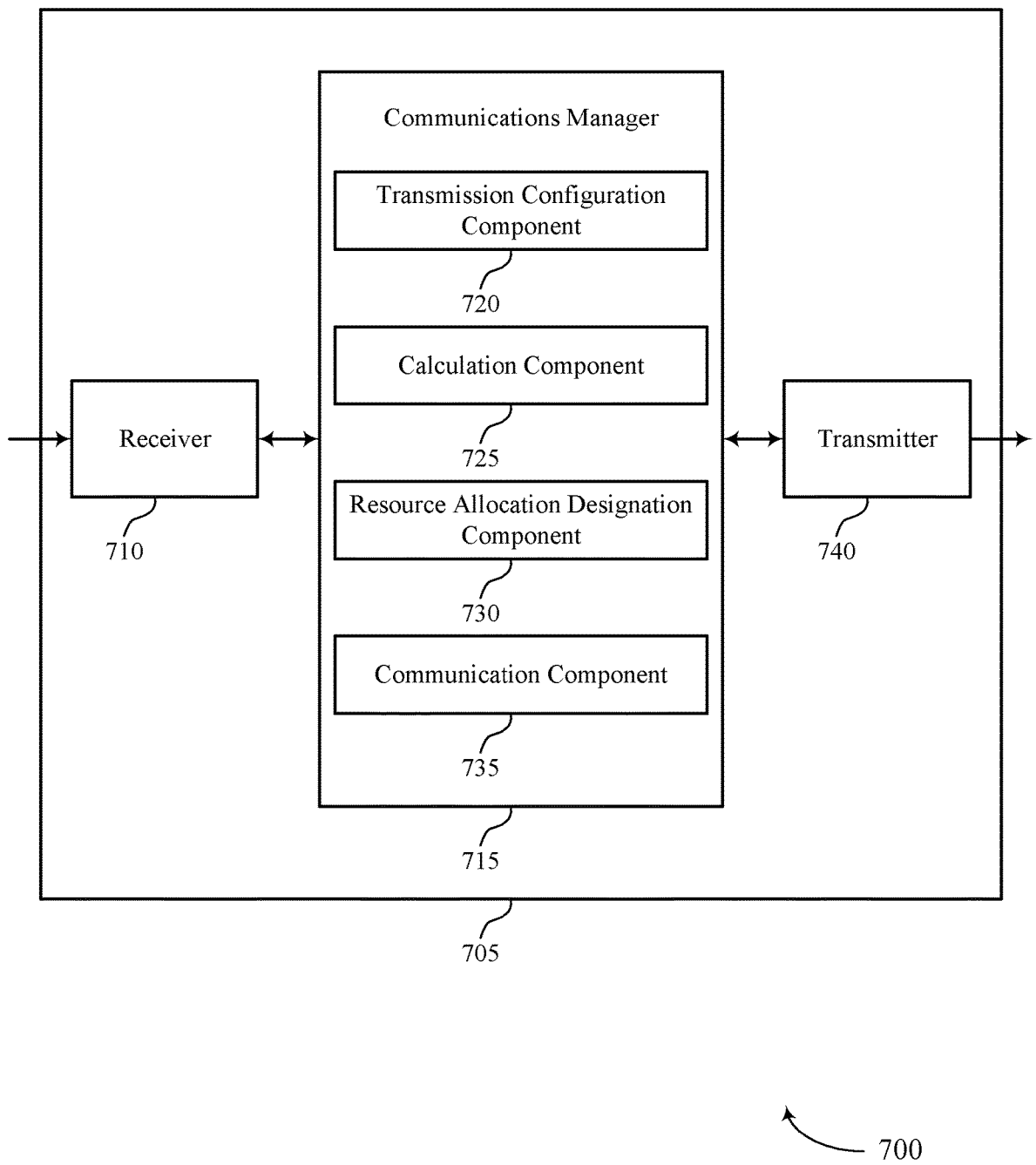

FIG. 7 shows a block diagram 700 of a device 705 that supports determining transmission configurations for resource block groups and precoding resource block groups in accordance with aspects of the present disclosure. The device 705 may be an example of aspects of a device 605, a UE 115, or a base station 105 as described herein. The device 705 may include a receiver 710, a communications manager 715, and a transmitter 740. The device 705 may also include a processor. Each of these components may be in communication with one another (e.g., via one or more buses).

Receiver 710 may receive information such as packets, user data, or control information associated with various information channels (e.g., control channels, data channels, and information related to determining transmission configurations, etc.). Information may be passed on to other components of the device 705. The receiver 710 may be an example of aspects of the transceiver 920 or 1020 as described with reference to FIGS. 9 and 10. The receiver 710 may utilize a single antenna or a set of antennas.

The communications manager 715 may be an example of aspects of the communications manager 615 as described herein. The communications manager 715 may include a transmission configuration component 720, a calculation component 725, a resource allocation designation component 730, and a communication component 735. The communications manager 715 may be an example of aspects of the communications manager 910 or 1010 as described herein.

The transmission configuration component 720 may identify a transmission configuration for a carrier bandwidth allocated for communications with a second device, the transmission configuration indicating a resource block group size and a bandwidth part size. The calculation component 725 may calculate a number of resource block groups for the transmission configuration based on the resource block group size and the bandwidth part size and according to a first resource allocation type.

The transmission configuration component 720 may identify a transmission configuration for the carrier bandwidth that further indicates a start resource block for the bandwidth part. The calculation component 725 may calculate the number of resource block groups for the transmission configuration based at least in part on the resource block group size, the bandwidth part size, and a start resource block of the bandwidth part.

The resource allocation designation component 730 may designate the resource block group size for the transmission configuration as equal to the bandwidth part size based on the calculated number of resource block groups being equal to one. The communication component 735 may communicate with the second device using the carrier bandwidth according to the transmission configuration. The transmission configuration component 720 may identify the transmission configuration that indicates a start resource block of the bandwidth part.

The transmission configuration component 720 may identify a transmission configuration for a carrier bandwidth allocated for communications with a second device, the transmission configuration indicating a resource block group size and a bandwidth part size. The calculation component 725 may determine whether a sum of the bandwidth part size and a start bandwidth part of the carrier bandwidth modulo the resource block group size is less than or equal to the resource block group size.

The resource allocation designation component 730 may designate the resource block group size for the transmission configuration as equal to the bandwidth part size based on the determining. The communication component 735 may communicate with the second device using the carrier bandwidth according to the transmission configuration.

The transmission configuration component 720 may identify a transmission configuration for a carrier bandwidth allocated for communications with a second device, the transmission configuration indicating a precoding resource block group size and a bandwidth part size. The calculation component 725 may calculate a number of precoding resource block groups for the transmission configuration based on the precoding resource block group size and the bandwidth part size. The calculation component 725 may calculate the number of precoding resource block groups for the transmission configuration based at least in part on the precoding resource block group size, the bandwidth part size, and a start precoding resource block of the bandwidth part.

The resource allocation designation component 730 may designate the precoding resource block group size for the transmission configuration as equal to the bandwidth part size based on the calculated number of precoding resource block groups being equal to one. The resource allocation designation component 730 may identify the transmission configuration that indicates the start precoding resource block of the bandwidth part.

The communication component 735 may communicate with the second device using the carrier bandwidth according to the transmission configuration. The transmission configuration component 720 may identify a transmission configuration for a carrier bandwidth allocated for communications with a second device, the transmission configuration indicating a precoding resource block group size and a bandwidth part size. The calculation component 725 may determine whether a sum of the bandwidth part size and a start bandwidth part of the carrier bandwidth modulo the precoding resource block group size is less than or equal to the precoding resource block group size.

The resource allocation designation component 730 may designate the precoding resource block group size for the transmission configuration as equal to the bandwidth part size based on the determining. The communication component 735 may communicate with the second device using the carrier bandwidth according to the transmission configuration.

The transmission configuration component 720 may identify the transmission configuration that indicates the start precoding resource block of the bandwidth part.

Transmitter 740 may transmit signals generated by other components of the device 705. In some examples, the transmitter 740 may be collocated with a receiver 710 in a transceiver module. For example, the transmitter 740 may be an example of aspects of the transceiver 920 or 1020 as described with reference to FIGS. 9 and 10. The transmitter 740 may utilize a single antenna or a set of antennas.

Figure 8:
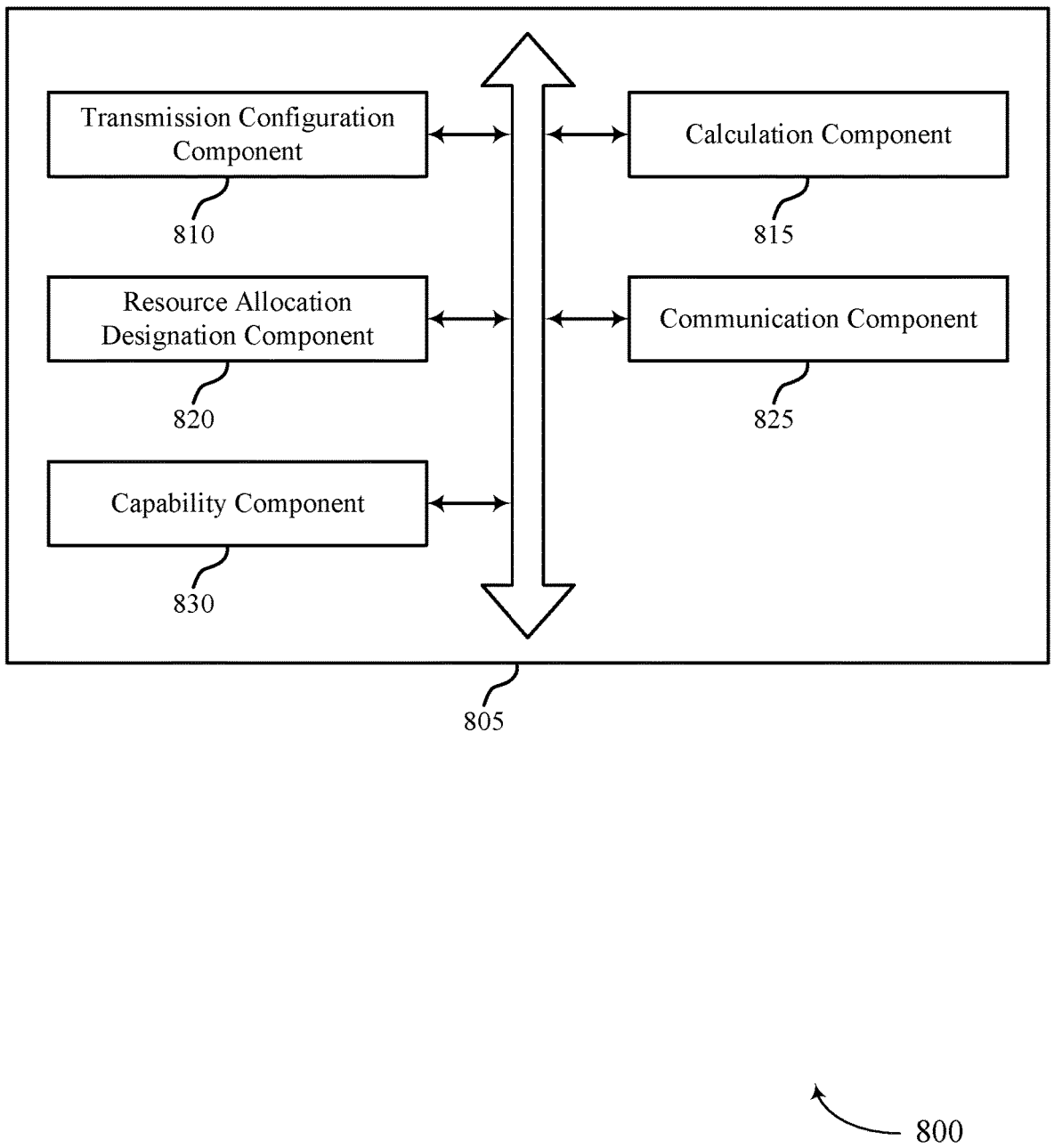
FIG. 8 shows a block diagram of a communications manager that supports determining transmission configurations for resource block groups and precoding resource block groups in accordance with aspects of the present disclosure.

FIG. 8 shows a block diagram 800 of a communications manager 805 that supports determining transmission configurations for resource block groups and precoding resource block groups in accordance with aspects of the present disclosure. The communications manager 805 may be an example of aspects of a communications manager 615, a communications manager 715, or a communications manager 910 described herein. The communications manager 805 may include a transmission configuration component 810, a calculation component 815, a resource allocation designation component 820, a communication component 825, and a capability component 830. Each of these modules may communicate, directly or indirectly, with one another (e.g., via one or more buses).

The transmission configuration component 810 may identify a transmission configuration for a carrier bandwidth allocated for communications with a second device, the transmission configuration indicating a resource block group size and a bandwidth part size. In some examples, the transmission configuration component 810 may identify a transmission configuration for a carrier bandwidth allocated for communications with a second device, the transmission configuration indicating a resource block group size and a bandwidth part size. In some examples, the transmission configuration component 810 may identify a transmission configuration for a carrier bandwidth allocated for communications with a second device, the transmission configuration indicating a precoding resource block group size and a bandwidth part size.

In some examples, the transmission configuration component 810 may identify a transmission configuration for a carrier bandwidth allocated for communications with a second device, the transmission configuration indicating a precoding resource block group size and a bandwidth part size. In some examples, the transmission configuration component 810 may identify the transmission configuration according to a resource allocation type to indicate the resource block group size and the bandwidth part size.

In some examples, the transmission configuration component 810 may identify the resource block group size of a first resource block group of the carrier bandwidth as a first value based on a resource allocation type. In some examples, the transmission configuration component 810 may identify the resource block group size of a last resource block group of the carrier bandwidth as a second value based on the resource allocation type, where the first resource block group and the last resource block group of the carrier bandwidth include a same resource block group and where the first value and the second value are different.

In some examples, the transmission configuration component 810 may identify the transmission configuration according to a resource allocation type to indicate the resource block group size and the bandwidth part size. In some examples, the transmission configuration component 810 may identify the resource block group size of a first resource block group of the carrier bandwidth as a first value based on a resource allocation type.

In some examples, the transmission configuration component 810 may identify the resource block group size of a last resource block group of the carrier bandwidth as a second value based on the resource allocation type, where the first resource block group and the last resource block group of the carrier bandwidth include a same resource block group and where the first value and the second value are different. In some examples, the transmission configuration component 810 may identify the transmission configuration according to a resource allocation type to indicate the precoding resource block group size and the bandwidth part size. In some examples, the transmission configuration component 810 may identify the precoding resource block group size of a first precoding resource block group of the carrier bandwidth as a first value.

In some examples, the transmission configuration component 810 may identify the precoding resource block group size of a last precoding resource block group of the carrier bandwidth as a second value, where the first precoding resource block group and the last precoding resource block group of the carrier bandwidth include a same precoding resource block group and where the first value and the second value are different. In some examples, the transmission configuration component 810 may identify the transmission configuration according to a resource allocation type to indicate the precoding resource block group size and the bandwidth part size.

In some examples, the transmission configuration component 810 may identify the precoding resource block group size of a first precoding resource block group of the carrier bandwidth as a first value based on a resource allocation type. In some examples, the transmission configuration component 810 may identify the precoding resource block group size of a last precoding resource block group of the carrier bandwidth as a second value based on the resource allocation type, where the first precoding resource block group and the last precoding resource block group of the carrier bandwidth include a same precoding resource block group and where the first value and the second value are different.

The calculation component 815 may calculate a number of resource block groups for the transmission configuration based on the resource block group size and the bandwidth part size and according to a first resource allocation type. In some examples, the calculation component 815 may determine whether a sum of the bandwidth part size and a start bandwidth part of the carrier bandwidth modulo the resource block group size is less than or equal to the resource block group size. In some examples, the calculation component 815 may calculate a number of precoding resource block groups for the transmission configuration based on the precoding resource block group size and the bandwidth part size. In some examples, the calculation component 815 may determine whether a sum of the bandwidth part size and a start bandwidth part of the carrier bandwidth modulo the precoding resource block group size is less than or equal to the precoding resource block group size.

The resource allocation designation component 820 may designate the resource block group size for the transmission configuration as equal to the bandwidth part size based on the calculated number of resource block groups being equal to one. In some examples, the resource allocation designation component 820 may designate the resource block group size for the transmission configuration as equal to the bandwidth part size based on the determining.

In some examples, the resource allocation designation component 820 may designate the precoding resource block group size for the transmission configuration as equal to the bandwidth part size based on the calculated number of precoding resource block groups being equal to one. In some examples, the resource allocation designation component 820 may designate the precoding resource block group size for the transmission configuration as equal to the bandwidth part size based on the determining.

The communication component 825 may communicate with the second device using the carrier bandwidth according to the transmission configuration. In some examples, the communication component 825 may communicate with the second device using the carrier bandwidth according to the transmission configuration. In some examples, the communication component 825 may communicate with the second device using the carrier bandwidth according to the transmission configuration.

In some examples, the communication component 825 may communicate with the second device using the carrier bandwidth according to the transmission configuration. In some examples, the communication component 825 may transmit, to a UE, a transmission including resources allocated using the designated resource block group size. In some examples, the communication component 825 may transmit, to a base station, a transmission including resources allocated using the designated resource block group size.

In some examples, the communication component 825 may receive, at a UE, a transmission including resources allocated using the designated resource block group size. In some examples, the communication component 825 may decode the transmission based on the designated resource block group size. In some examples, the communication component 825 may transmit, to a UE, a transmission including resources allocated using the designated resource block group size.

In some examples, the communication component 825 may transmit, to a base station, a transmission including resources allocated using the designated resource block group size. In some examples, the communication component 825 may receive, at a UE, a transmission including resources allocated using the designated resource block group size.

In some examples, the communication component 825 may decode the transmission based on the designated resource block group size. In some examples, the communication component 825 may transmit, to a UE, a transmission including resources allocated using the designated precoding resource block group size. In some examples, the communication component 825 may transmit, to a base station, a transmission including resources allocated using the designated precoding resource block group size.

In some examples, the communication component 825 may receive, at a UE, a transmission including resources allocated using the designated precoding resource block group size. In some examples, the communication component 825 may decode the transmission based on the designated precoding resource block group size. In some examples, the communication component 825 may transmit, to a UE, a transmission including resources allocated using the designated precoding resource block group size.

In some examples, the communication component 825 may transmit, to a base station, a transmission including resources allocated using the designated precoding resource block group size. In some examples, the communication component 825 may receive, at a UE, a transmission including resources allocated using the designated precoding resource block group size. In some examples, the communication component 825 may decode the transmission based on the designated precoding resource block group size.

The capability component 830 may receive, from a UE, a capability indication indicating that the UE is capable of designating the resource block group size as equal to the bandwidth part size based on the calculated number of resource block groups being equal to one. In some examples, the capability component 830 may receive, from a UE, a capability indication indicating that the UE is capable of designating the resource block group size as equal to the bandwidth part size based on the determining.

In some examples, the capability component 830 may receive, from a UE, a capability indication indicating that the UE is capable of designating the precoding resource block group size as equal to the bandwidth part size based on the calculated number of precoding resource block groups being equal to one. In some examples, the capability component 830 may receive, from a UE, a capability indication indicating that the UE is capable of designating the precoding resource block group size as equal to the bandwidth part size based on the determining.

Figure 9:
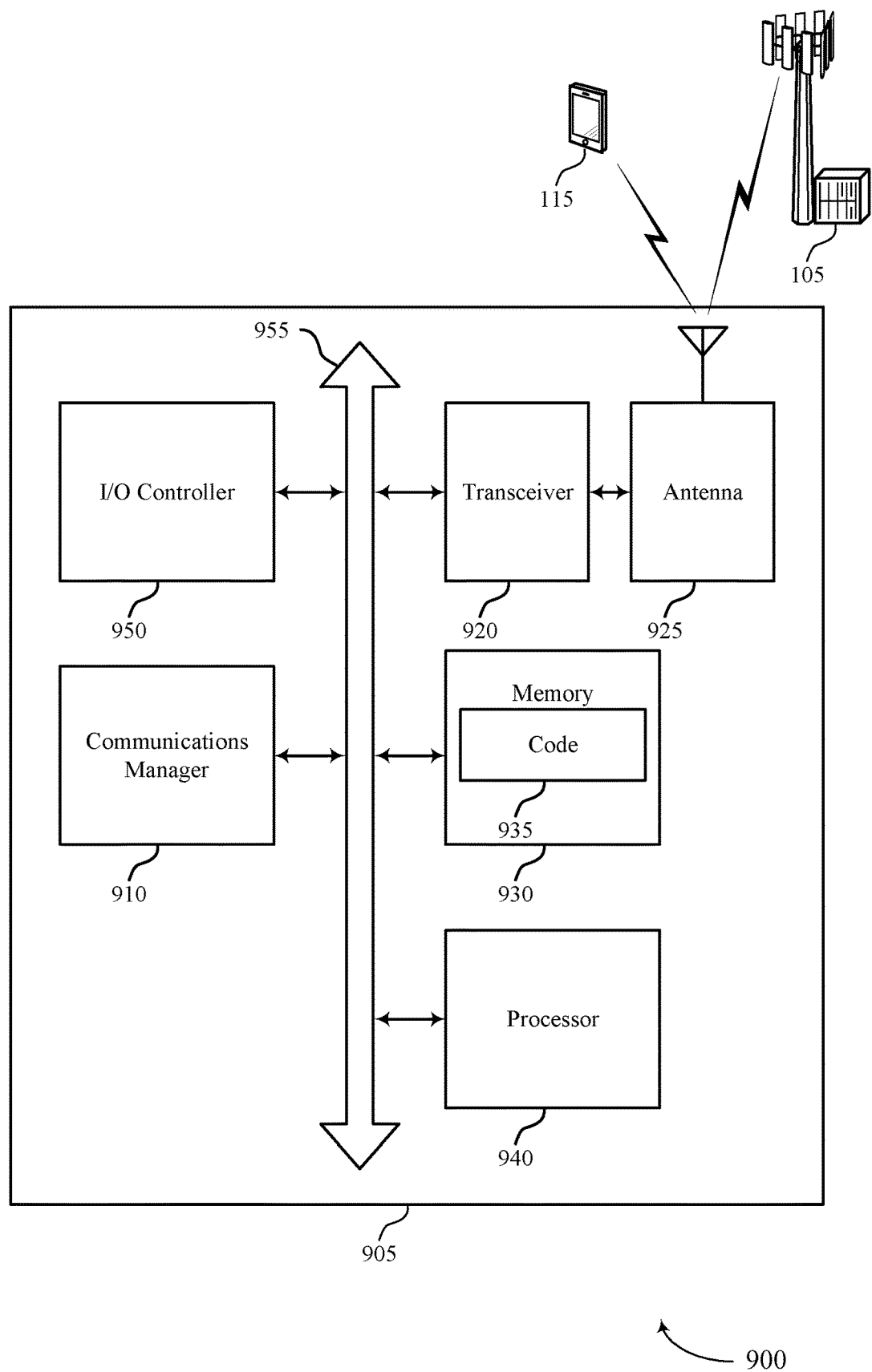
FIG. 9 shows a diagram of a system including a user equipment (UE) that supports determining transmission configurations for resource block groups and precoding resource block groups in accordance with aspects of the present disclosure.

FIG. 9 shows a diagram of a system 900 including a device 905 that supports determining transmission configurations for resource block groups and precoding resource block groups in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, a transceiver 920, an antenna 925, memory 930, a processor 940, and an I/O controller 950. These components may be in electronic communication via one or more buses (e.g., bus 955).

The communications manager 910 may identify a transmission configuration for a carrier bandwidth allocated for communications with a second device, the transmission configuration indicating a resource block group size and a bandwidth part size, calculate a number of resource block groups for the transmission configuration based on the resource block group size and the bandwidth part size and according to a first resource allocation type, designate the resource block group size for the transmission configuration as equal to the bandwidth part size based on the calculated number of resource block groups being equal to one, and communicate with the second device using the carrier bandwidth according to the transmission configuration. The communications manager 910 may also identify a transmission configuration for a carrier bandwidth allocated for communications with a second device, the transmission configuration indicating a resource block group size and a bandwidth part size, determine whether a sum of the bandwidth part size and a start bandwidth part of the carrier bandwidth modulo the resource block group size is less than or equal to the resource block group size, designate the resource block group size for the transmission configuration as equal to the bandwidth part size based on the determining, and communicate with the second device using the carrier bandwidth according to the transmission configuration. The communications manager 910 may also identify a transmission configuration for a carrier bandwidth allocated for communications with a second device, the transmission configuration indicating a precoding resource block group size and a bandwidth part size, calculate a number of precoding resource block groups for the transmission configuration based on the precoding resource block group size and the bandwidth part size, designate the precoding resource block group size for the transmission configuration as equal to the bandwidth part size based on the calculated number of precoding resource block groups being equal to one, and communicate with the second device using the carrier bandwidth according to the transmission configuration. The communications manager 910 may also identify a transmission configuration for a carrier bandwidth allocated for communications with a second device, the transmission configuration indicating a precoding resource block group size and a bandwidth part size, determine whether a sum of the bandwidth part size and a start bandwidth part of the carrier bandwidth modulo the precoding resource block group size is less than or equal to the precoding resource block group size, designate the precoding resource block group size for the transmission configuration as equal to the bandwidth part size based on the determining, and communicate with the second device using the carrier bandwidth according to the transmission configuration.

Transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM), read-only memory (ROM), or a combination thereof. The memory 930 may store computer-readable code 935 including instructions that, when executed by a processor (e.g., the processor 940) cause the device to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting determining transmission configurations).

The I/O controller 950 may manage input and output signals for the device 905. The I/O controller 950 may also manage peripherals not integrated into the device 905. In some cases, the I/O controller 950 may represent a physical connection or port to an external peripheral. In some cases, the I/O controller 950 may utilize an operating system such as iOS®, ANDROID®, MS-DOS®, MS-WINDOWS®, OS/2®, UNIX®, LINUX®, or another known operating system. In other cases, the I/O controller 950 may represent or interact with a modem, a keyboard, a mouse, a touchscreen, or a similar device. In some cases, the I/O controller 950 may be implemented as part of a processor. In some cases, a user may interact with the device 905 via the I/O controller 950 or via hardware components controlled by the I/O controller 950.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
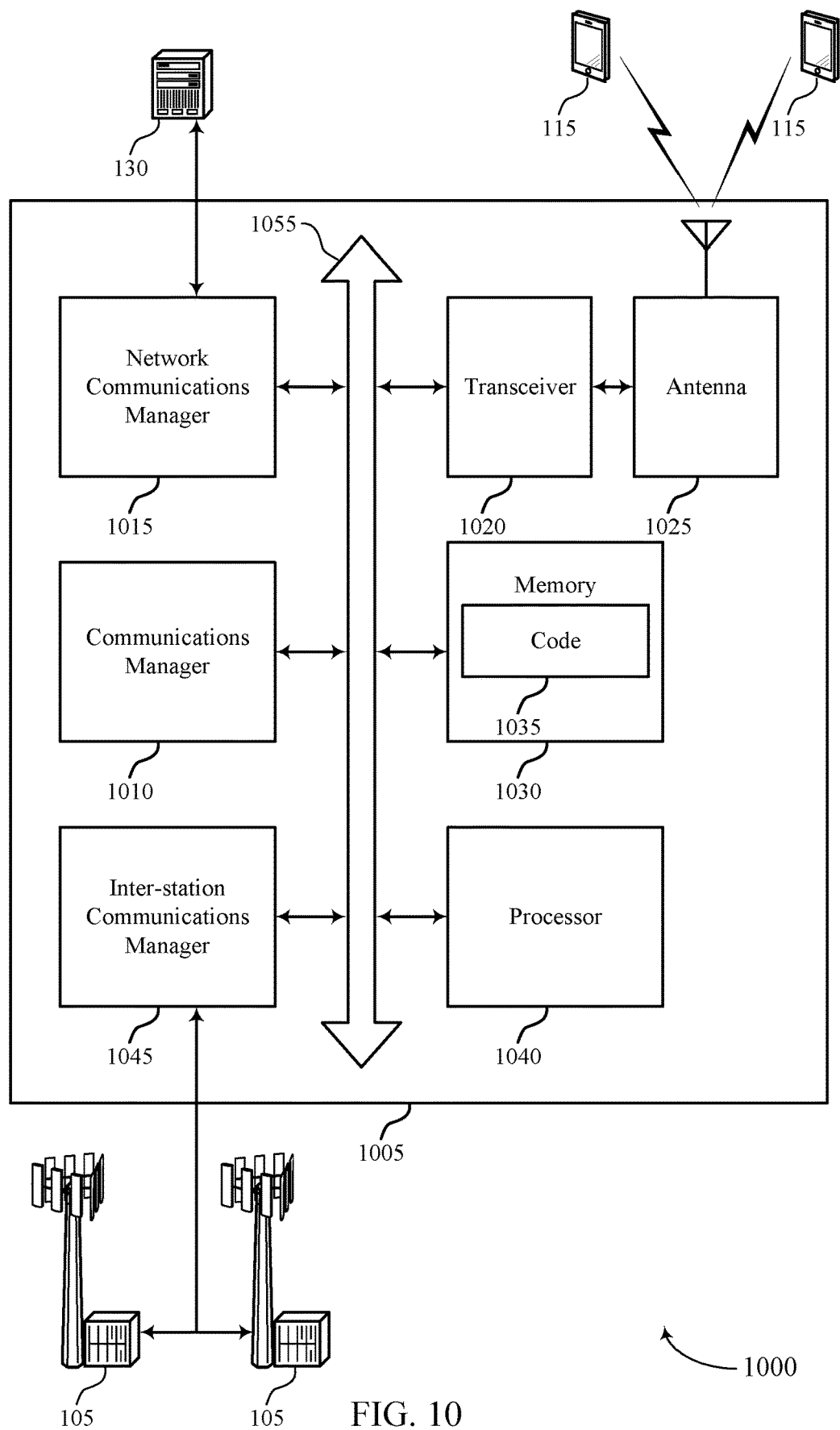
FIG. 10 shows a diagram of a system including a base station that supports determining transmission configurations for resource block groups and precoding resource block groups in accordance with aspects of the present disclosure.

FIG. 10 shows a diagram of a system 1000 including a device 1005 that supports determining transmission configurations for resource block groups and precoding resource block groups in accordance with aspects of the present disclosure. The device 1005 may be an example of or include the components of device 605, device 705, or a base station 105 as described herein. The device 1005 may include components for bi-directional voice and data communications including components for transmitting and receiving communications, including a communications manager 1010, a network communications manager 1015, a transceiver 1020, an antenna 1025, memory 1030, a processor 1040, and an inter-station communications manager 1045. These components may be in electronic communication via one or more buses (e.g., bus 1055).

The communications manager 1010 may identify a transmission configuration for a carrier bandwidth allocated for communications with a second device, the transmission configuration indicating a resource block group size and a bandwidth part size, calculate a number of resource block groups for the transmission configuration based on the resource block group size and the bandwidth part size and according to a first resource allocation type, designate the resource block group size for the transmission configuration as equal to the bandwidth part size based on the calculated number of resource block groups being equal to one, and communicate with the second device using the carrier bandwidth according to the transmission configuration.

The communications manager 1010 may also identify a transmission configuration for a carrier bandwidth allocated for communications with a second device, the transmission configuration indicating a resource block group size and a bandwidth part size, determine whether a sum of the bandwidth part size and a start bandwidth part of the carrier bandwidth modulo the resource block group size is less than or equal to the resource block group size, designate the resource block group size for the transmission configuration as equal to the bandwidth part size based on the determining, and communicate with the second device using the carrier bandwidth according to the transmission configuration.

The communications manager 1010 may also identify a transmission configuration for a carrier bandwidth allocated for communications with a second device, the transmission configuration indicating a precoding resource block group size and a bandwidth part size, calculate a number of precoding resource block groups for the transmission configuration based on the precoding resource block group size and the bandwidth part size, designate the precoding resource block group size for the transmission configuration as equal to the bandwidth part size based on the calculated number of precoding resource block groups being equal to one, and communicate with the second device using the carrier bandwidth according to the transmission configuration.

The communications manager 1010 may also identify a transmission configuration for a carrier bandwidth allocated for communications with a second device, the transmission configuration indicating a precoding resource block group size and a bandwidth part size, determine whether a sum of the bandwidth part size and a start bandwidth part of the carrier bandwidth modulo the precoding resource block group size is less than or equal to the precoding resource block group size, designate the precoding resource block group size for the transmission configuration as equal to the bandwidth part size based on the determining, and communicate with the second device using the carrier bandwidth according to the transmission configuration.

Network communications manager 1015 may manage communications with the core network (e.g., via one or more wired backhaul links). For example, the network communications manager 1015 may manage the transfer of data communications for client devices, such as one or more UEs 115.

Transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM, ROM, or a combination thereof. The memory 1030 may store computer-readable code 1035 including instructions that, when executed by a processor (e.g., the processor 1040) cause the device to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting determining transmission configurations).

Inter-station communications manager 1045 may manage communications with other base station 105, and may include a controller or scheduler for controlling communications with UEs 115 in cooperation with other base stations 105. For example, the inter-station communications manager 1045 may coordinate scheduling for transmissions to UEs 115 for various interference mitigation techniques such as beamforming or joint transmission. In some examples, inter-station communications manager 1045 may provide an X2 interface within an LTE/LTE-A wireless communication network technology to provide communication between base stations 105.

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
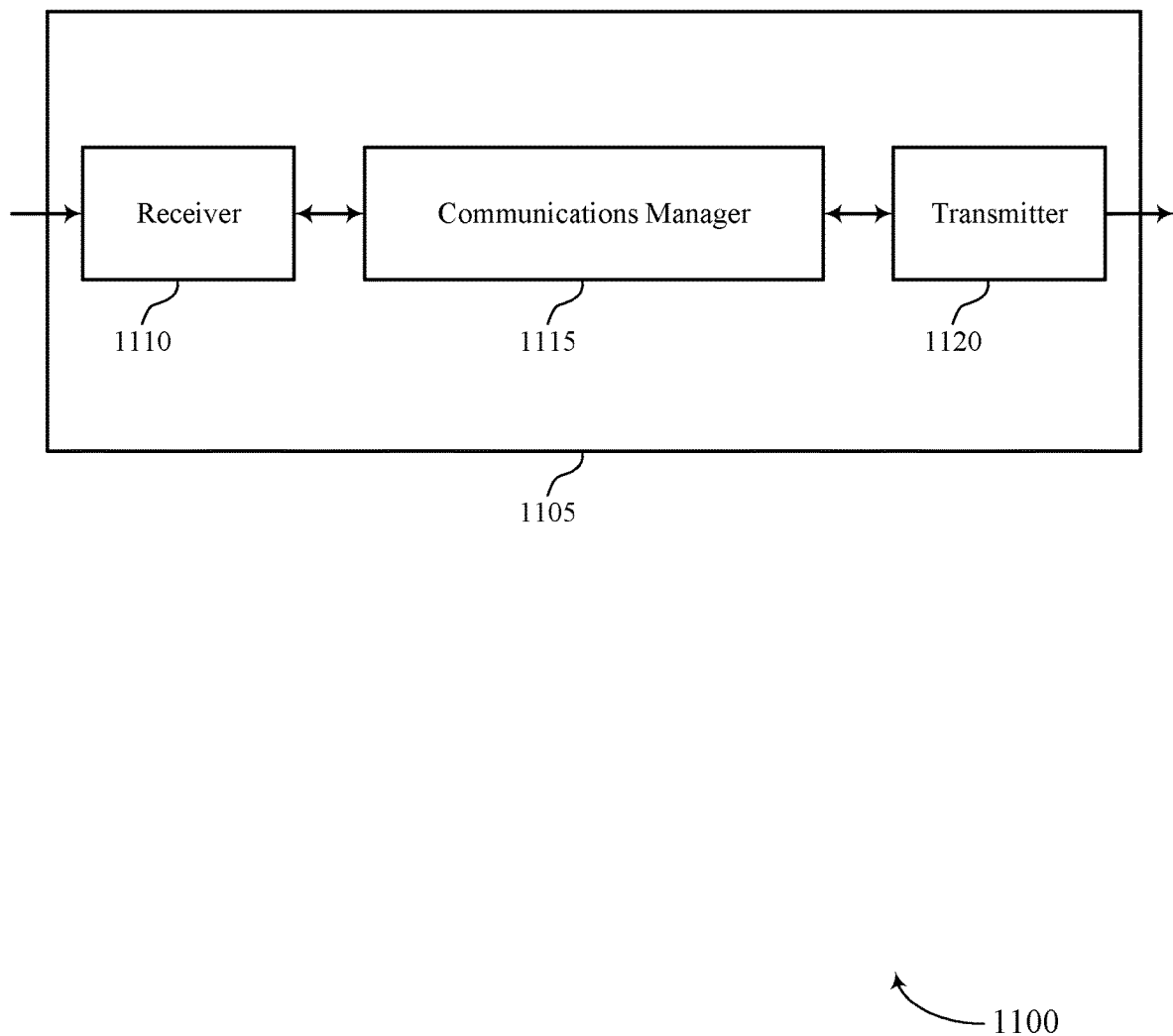
FIGS. 11 and 12 show block diagrams of devices that support determining transmission configurations for resource block groups and precoding resource block groups in accordance with aspects of the present disclosure.

FIG. 11 shows a block diagram 1100 of a device 1105 that supports determining transmission configurations for resource block groups and precoding resource block groups in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to determining transmission configurations, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may identify a transmission configuration for a carrier bandwidth allocated for communications with a UE, the transmission configuration indicating a resource block group size and a bandwidth part size, designate a first resource allocation type for the transmission configuration instead of a second resource allocation type for the transmission configuration for allocating resources to the carrier bandwidth based on the bandwidth part size being less than or equal to a bandwidth part size threshold and further based on the resource block group size, and transmit, to the UE, downlink control information indicating the first resource allocation type for the transmission configuration. The communications manager 1115 may also identify a transmission configuration for a carrier bandwidth allocated for communications with a UE, the transmission configuration indicating a bandwidth part size, designate a first resource allocation type for the transmission configuration instead of a second resource allocation type for the transmission configuration for allocating resources to the carrier bandwidth based on the bandwidth part size being less than or equal to a bandwidth part size threshold, and transmit, to the UE, downlink control information indicating the first resource allocation type for the transmission configuration. The communications manager 1115 may be an example of aspects of the communications manager 1410 described herein.

One implementation includes identifying a transmission configuration for a carrier bandwidth allocated for communications with a user equipment (UE), the transmission configuration indicating a resource block group size and a bandwidth part size, designating a first resource allocation type for the transmission configuration instead of a second resource allocation type for the transmission configuration for allocating resources to the carrier bandwidth based at least in part on the bandwidth part size being less than or equal to a bandwidth part size threshold and further based at least in part on the resource block group size, and transmitting, to the UE, downlink control information indicating the first resource allocation type for the transmission configuration. The actions performed by the communications manager 1115 as described may be implemented to realize one or more potential advantages. This implementation may allow to save power and increase battery live by avoiding potential allocation calculation errors. These errors may be handled in different ways according to UE configurations, carrier configurations, etc., but the implementation allows the UE to avoid the errors, and thus saving power and increasing battery live by avoiding error handling.

One implementation includes identifying a transmission configuration for a carrier bandwidth allocated for communications with a user equipment (UE), the transmission configuration indicating a bandwidth part size, designating a first resource allocation type for the transmission configuration instead of a second resource allocation type for the transmission configuration for allocating resources to the carrier bandwidth based at least in part on the bandwidth part size being less than or equal to a bandwidth part size threshold, and transmitting, to the UE, downlink control information indicating the first resource allocation type for the transmission configuration. The actions performed by the communications manager 615 as described may be implemented to realize one or more potential advantages. This implementation may allow to save power and increase battery live by avoiding potential allocation calculation errors. These errors may be handled in different ways according to UE configurations, carrier configurations, etc., but the implementation allows the UE to avoid the errors, and thus saving power and increasing battery live by avoiding error handling.

Based on designating the resource allocation type by the base station, the processing components may avoid wasting processing power performing calculations that may cause potential errors, handling errors, etc. Based on the received configuration (e.g., via DCI), the processor of the UE may turn on one or more processing units for receiving a transmission, increase a processing clock, or a similar mechanism within the UE. As such, when the data transmission is received, the processor may be ready to decode the transmission more efficiently through the reduction of calculation errors.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
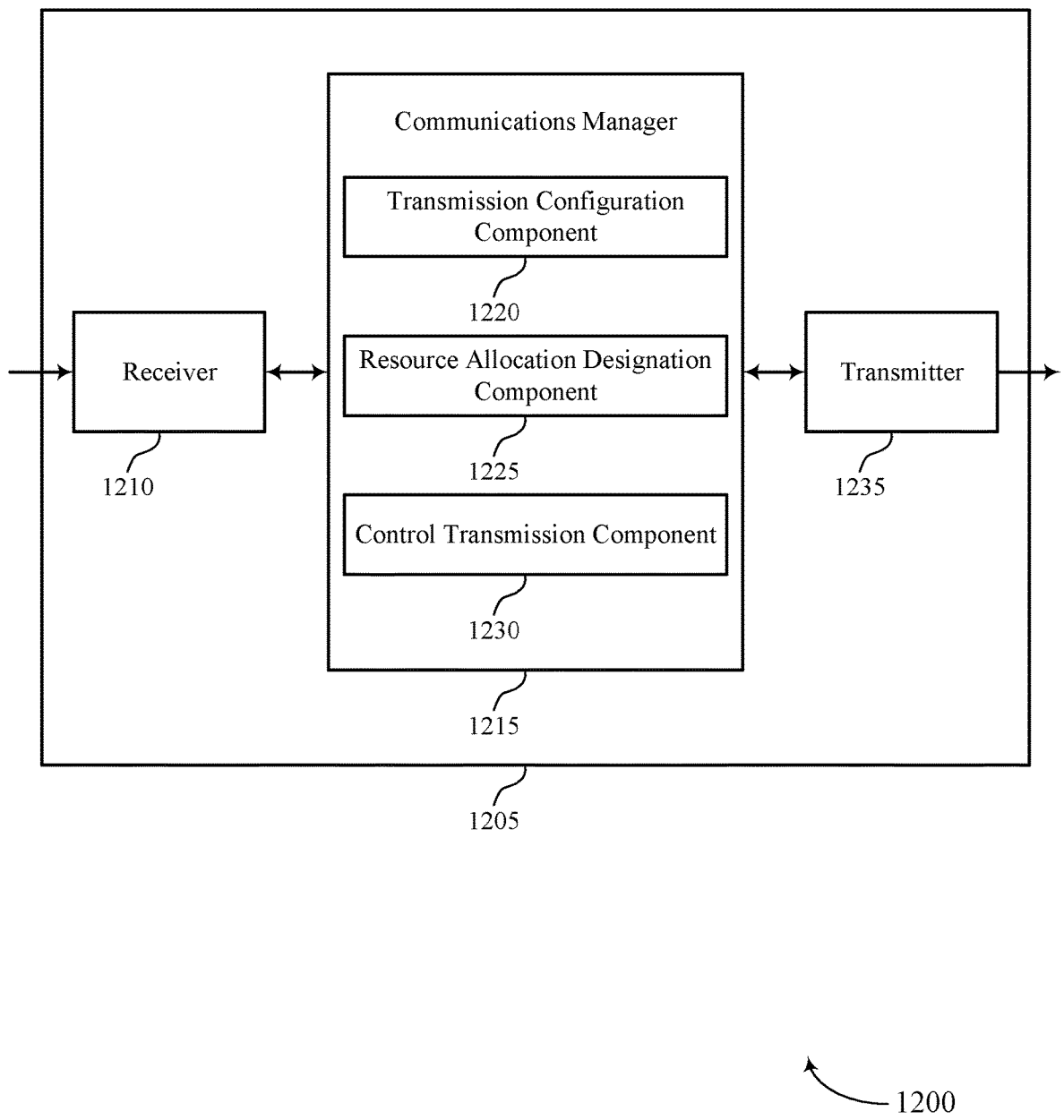

FIG. 12 shows a block diagram 1200 of a device 1205 that supports determining transmission configurations for resource block groups and precoding resource block groups in accordance with aspects of the present disclosure. The device 1205 may be an example of aspects of a device 1105, or a base station 105 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to determining transmission configurations, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a transmission configuration component 1220, a resource allocation designation component 1225, and a control transmission component 1230. The communications manager 1215 may be an example of aspects of the communications manager 1410 described herein.

The transmission configuration component 1220 may identify a transmission configuration for a carrier bandwidth allocated for communications with a UE, the transmission configuration indicating a resource block group size and a bandwidth part size.

The resource allocation designation component 1225 may designate a first resource allocation type for the transmission configuration instead of a second resource allocation type for the transmission configuration for allocating resources to the carrier bandwidth based on the bandwidth part size being less than or equal to a bandwidth part size threshold and further based on the resource block group size.

The control transmission component 1230 may transmit, to the UE, downlink control information indicating the first resource allocation type for the transmission configuration. The transmission configuration component 1220 may identify a transmission configuration for a carrier bandwidth allocated for communications with a UE, the transmission configuration indicating a bandwidth part size.

The resource allocation designation component 1225 may designate a first resource allocation type for the transmission configuration instead of a second resource allocation type for the transmission configuration for allocating resources to the carrier bandwidth based on the bandwidth part size being less than or equal to a bandwidth part size threshold. The control transmission component 1230 may transmit, to the UE, downlink control information indicating the first resource allocation type for the transmission configuration.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
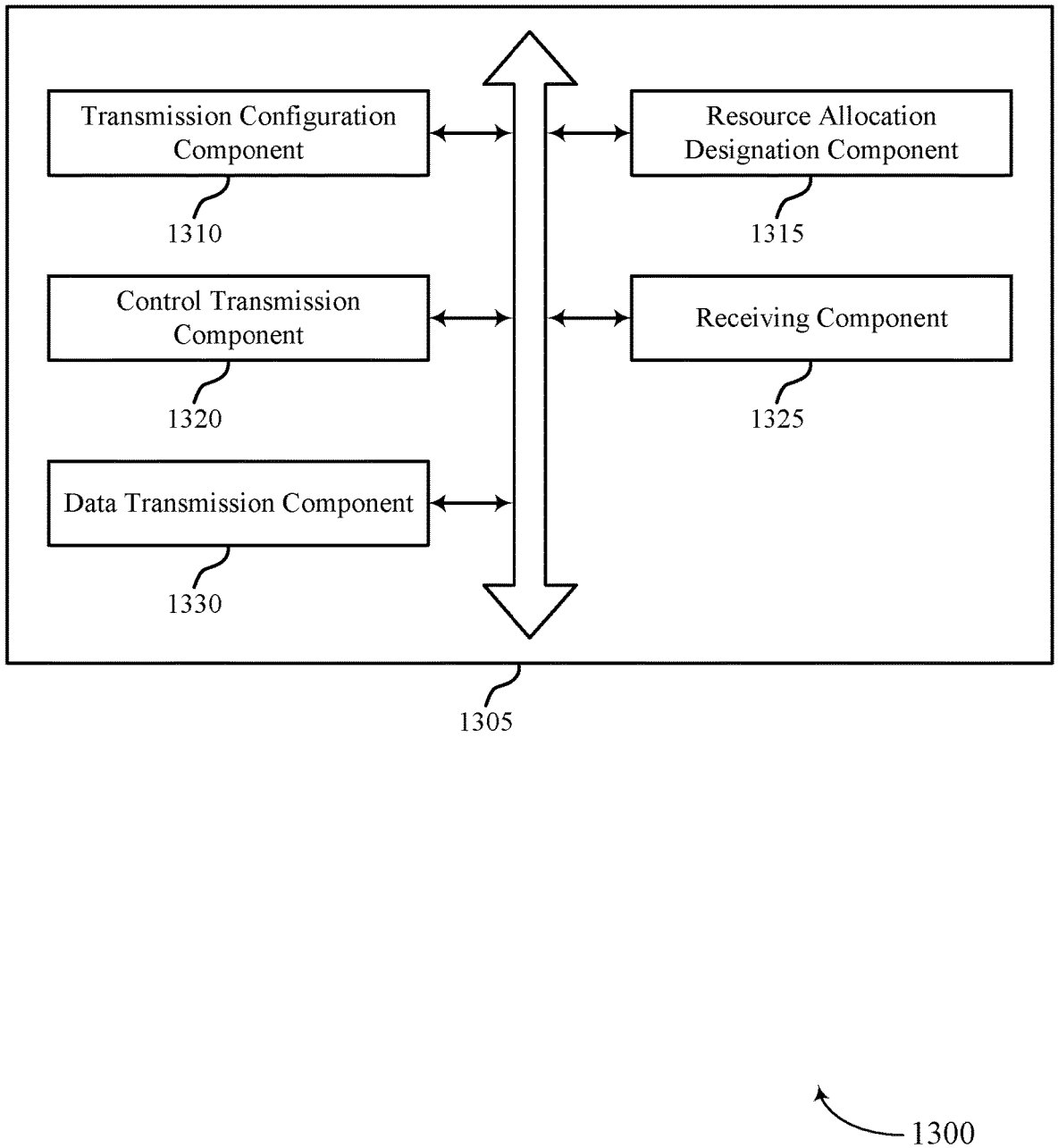
FIG. 13 shows a block diagram of a communications manager that supports determining transmission configurations for resource block groups and precoding resource block groups in accordance with aspects of the present disclosure.

FIG. 13 shows a block diagram 1300 of a communications manager 1305 that supports determining transmission configurations for resource block groups and precoding resource block groups in accordance with aspects of the present disclosure. The communications manager 1305 may be an example of aspects of a communications manager 1115, a communications manager 1215, or a communications manager 1410 described herein. The communications manager 1305 may include a transmission configuration component 1310, a resource allocation designation component 1315, a control transmission component 1320, a receiving component 1325, and a data transmission component 1330. Each of these modules may communicate, directly or indirectly, with one another (e.g., via one or more buses).

The transmission configuration component 1310 may identify a transmission configuration for a carrier bandwidth allocated for communications with a UE, the transmission configuration indicating a resource block group size and a bandwidth part size. In some examples, the transmission configuration component 1310 may identify a transmission configuration for a carrier bandwidth allocated for communications with a UE, the transmission configuration indicating a bandwidth part size. In some examples, the transmission configuration component 1310 may determine a configuration type indicating the resource block group size.

In some examples, the transmission configuration component 1310 may identify the transmission configuration according to the second resource allocation type to indicate the resource block group size and the bandwidth part size. In some examples, the transmission configuration component 1310 may identify the resource block group size of a first resource block group of the carrier bandwidth as a first value based on the second resource allocation type.

In some examples, the transmission configuration component 1310 may identify the resource block group size of a last resource block group of the carrier bandwidth as a second value based on the second resource allocation type, where the first resource block group and the last resource block group of the carrier bandwidth include a same resource block group and where the first value and the second value are different. In some examples, the transmission configuration component 1310 may identify the transmission configuration according to the second resource allocation type to indicate the bandwidth part size.

In some examples, the transmission configuration component 1310 may identify a resource block group size of a first resource block group of the carrier bandwidth as a first value based on the second resource allocation type. In some examples, the transmission configuration component 1310 may identify a resource block group size of a last resource block group of the carrier bandwidth as a second value based on the second resource allocation type, where the first resource block group and the last resource block group of the carrier bandwidth include a same resource block group and where the first value and the second value are different.

The resource allocation designation component 1315 may designate a first resource allocation type for the transmission configuration instead of a second resource allocation type for the transmission configuration for allocating resources to the carrier bandwidth based on the bandwidth part size being less than or equal to a bandwidth part size threshold and further based on the resource block group size. In some examples, the resource allocation designation component 1315 may designate a first resource allocation type for the transmission configuration instead of a second resource allocation type for the transmission configuration for allocating resources to the carrier bandwidth based on the bandwidth part size being less than or equal to a bandwidth part size threshold.

In some examples, the resource allocation designation component 1315 may determine that the bandwidth part size is equal to one resource block and the resource block group size is equal to two resource blocks, where the bandwidth part size threshold is one resource block based on the resource block group size being equal to two resource blocks. In some examples, the resource allocation designation component 1315 may determine that the bandwidth part size is less than or equal to three resource blocks and the resource block group size is equal to four resource blocks, where the bandwidth part size threshold is three resource blocks based on the resource block group size being equal to four resource blocks.

In some examples, the resource allocation designation component 1315 may designate a type 1 resource allocation as the first resource allocation type for the transmission configuration instead of a type 0 resource allocation as the second resource allocation type for the transmission configuration. In some examples, the resource allocation designation component 1315 may designate that the bandwidth part size is greater than or equal to the resource block group size. In some examples, the resource allocation designation component 1315 may determine that the bandwidth part size is equal to one resource block.

In some examples, the resource allocation designation component 1315 may determine that the bandwidth part size is less than or equal to three resource blocks. In some examples, the resource allocation designation component 1315 may allocate resources including contiguous physical resource blocks. In some examples, the resource allocation designation component 1315 may designate a wideband precoding granularity as the first resource allocation type for the transmission configuration over a two precoding granularity and over a four precoding granularity as the second resource allocation type for the transmission configuration.

The control transmission component 1320 may transmit, to the UE, downlink control information indicating the first resource allocation type for the transmission configuration. In some examples, the control transmission component 1320 may transmit, to the UE, downlink control information indicating the first resource allocation type for the transmission configuration. In some examples, the control transmission component 1320 may transmit the downlink control information indicating a resource block start parameter and a number of resource blocks.

The receiving component 1325 may receive, from the UE, a transmission including resources allocated according to the first resource allocation type. In some examples, the receiving component 1325 may receive, from the UE, a transmission including resources allocated according to the first resource allocation type.

The data transmission component 1330 may transmit, to the UE, a transmission including resources allocated according to the first resource allocation type. In some examples, the data transmission component 1330 may transmit, to the UE, a transmission including resources allocated according to the first resource allocation type.

Figure 14:
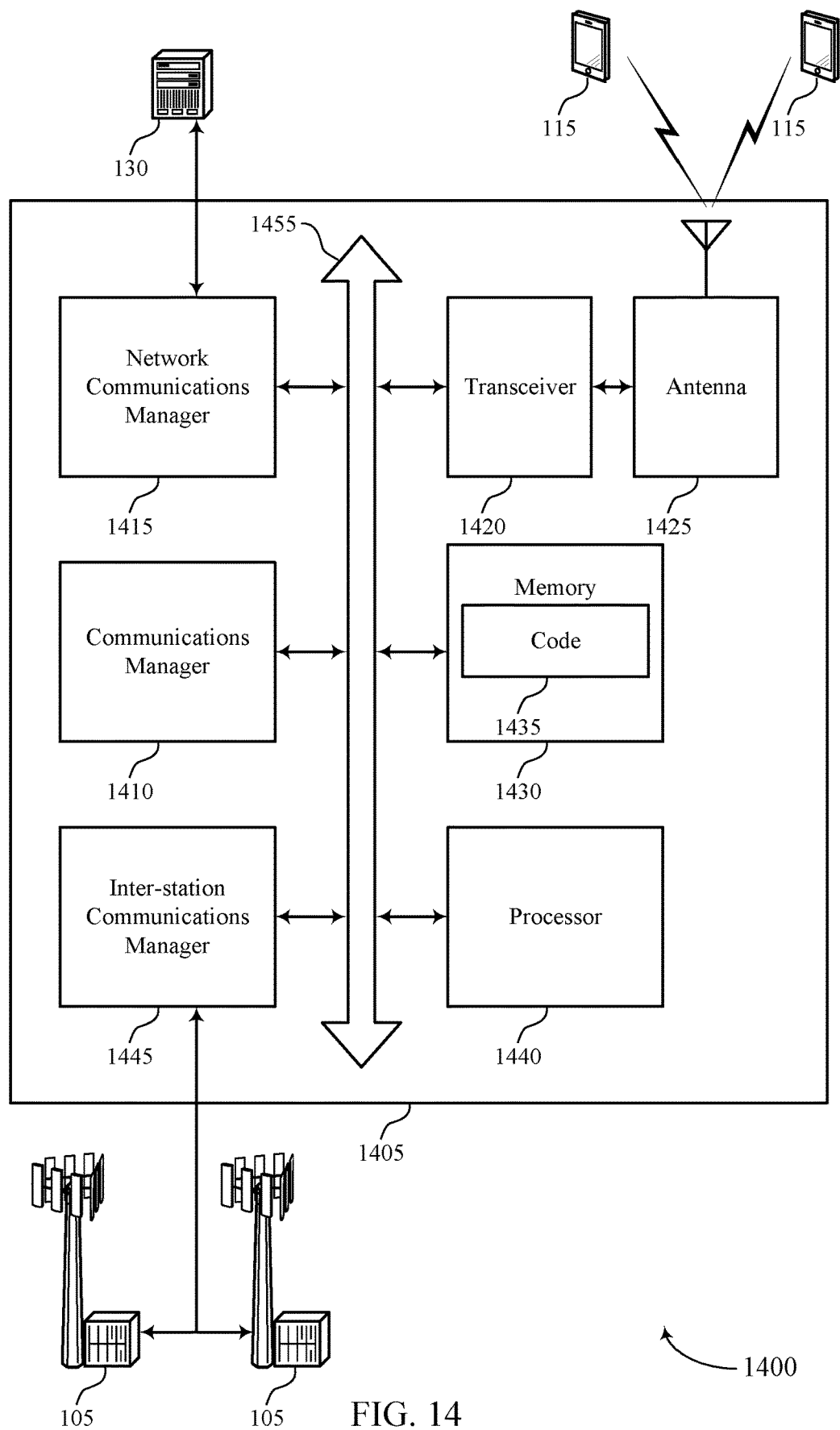
FIG. 14 shows a diagram of a system including a device that supports determining transmission configurations for resource block groups and precoding resource block groups in accordance with aspects of the present disclosure.

FIG. 14 shows a diagram of a system 1400 including a device 1405 that supports determining transmission configurations for resource block groups and precoding resource block groups in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1455).

The communications manager 1410 may identify a transmission configuration for a carrier bandwidth allocated for communications with a UE, the transmission configuration indicating a resource block group size and a bandwidth part size, designate a first resource allocation type for the transmission configuration instead of a second resource allocation type for the transmission configuration for allocating resources to the carrier bandwidth based on the bandwidth part size being less than or equal to a bandwidth part size threshold and further based on the resource block group size, and transmit, to the UE, downlink control information indicating the first resource allocation type for the transmission configuration. The communications manager 1410 may also identify a transmission configuration for a carrier bandwidth allocated for communications with a UE, the transmission configuration indicating a bandwidth part size, designate a first resource allocation type for the transmission configuration instead of a second resource allocation type for the transmission configuration for allocating resources to the carrier bandwidth based on the bandwidth part size being less than or equal to a bandwidth part size threshold, and transmit, to the UE, downlink control information indicating the first resource allocation type for the transmission configuration.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting determining transmission configurations).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
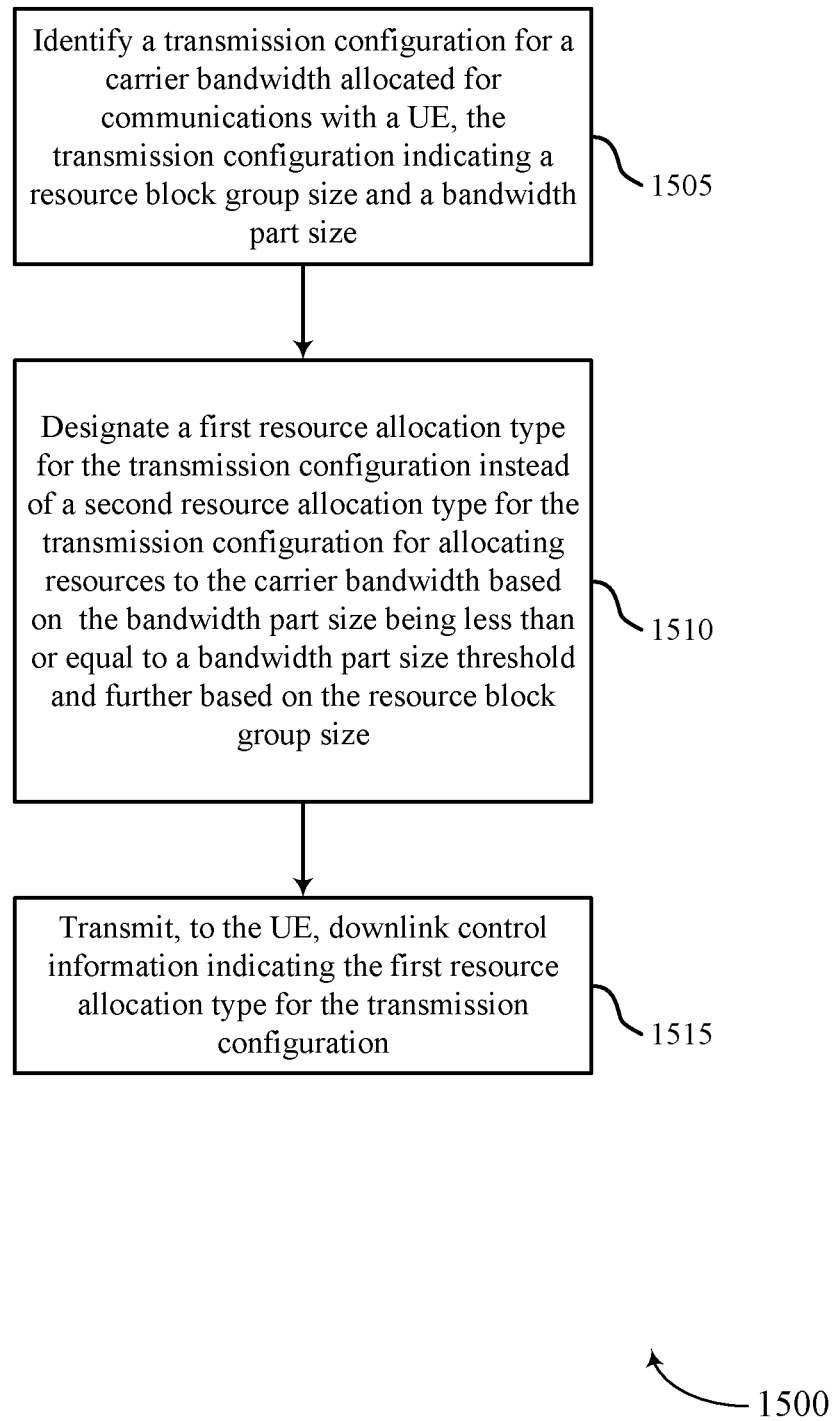
FIGS. 15 through 20 show flowcharts illustrating methods that support determining transmission configurations for resource block groups and precoding resource block groups in accordance with aspects of the present disclosure.

FIG. 15 shows a flowchart illustrating a method 1500 that supports determining transmission configurations for resource block groups and precoding resource block groups in accordance with aspects of the present disclosure. The operations of method 1500 may be implemented by a base station 105 or its components as described herein. For example, the operations of method 1500 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1505, the base station may identify a transmission configuration for a carrier bandwidth allocated for communications with a UE, the transmission configuration indicating a resource block group size and a bandwidth part size. The operations of 1505 may be performed according to the methods described herein. In some examples, aspects of the operations of 1505 may be performed by a transmission configuration component as described with reference to FIGS. 11 through 14. Additionally or alternatively, means for performing 1505 may, but not necessarily, include, for example, antenna 925, transceiver 920, communications manager 910, memory 930 (including code 935), processor 940 and/or bus 955.

At 1510, the base station may designate a first resource allocation type for the transmission configuration instead of a second resource allocation type for the transmission configuration for allocating resources to the carrier bandwidth based on the bandwidth part size being less than or equal to a bandwidth part size threshold and further based on the resource block group size. The operations of 1510 may be performed according to the methods described herein. In some examples, aspects of the operations of 1510 may be performed by a resource allocation designation component as described with reference to FIGS. 11 through 14. Additionally or alternatively, means for performing 1510 may, but not necessarily, include, for example, antenna 925, transceiver 920, communications manager 910, memory 930 (including code 935), processor 940 and/or bus 955.

At 1515, the base station may transmit, to the UE, downlink control information indicating the first resource allocation type for the transmission configuration. The operations of 1515 may be performed according to the methods described herein. In some examples, aspects of the operations of 1515 may be performed by a control transmission component as described with reference to FIGS. 11 through 14. Additionally or alternatively, means for performing 1515 may, but not necessarily, include, for example, antenna 925, transceiver 920, communications manager 910, memory 930 (including code 935), processor 940 and/or bus 955.

Figure 16:
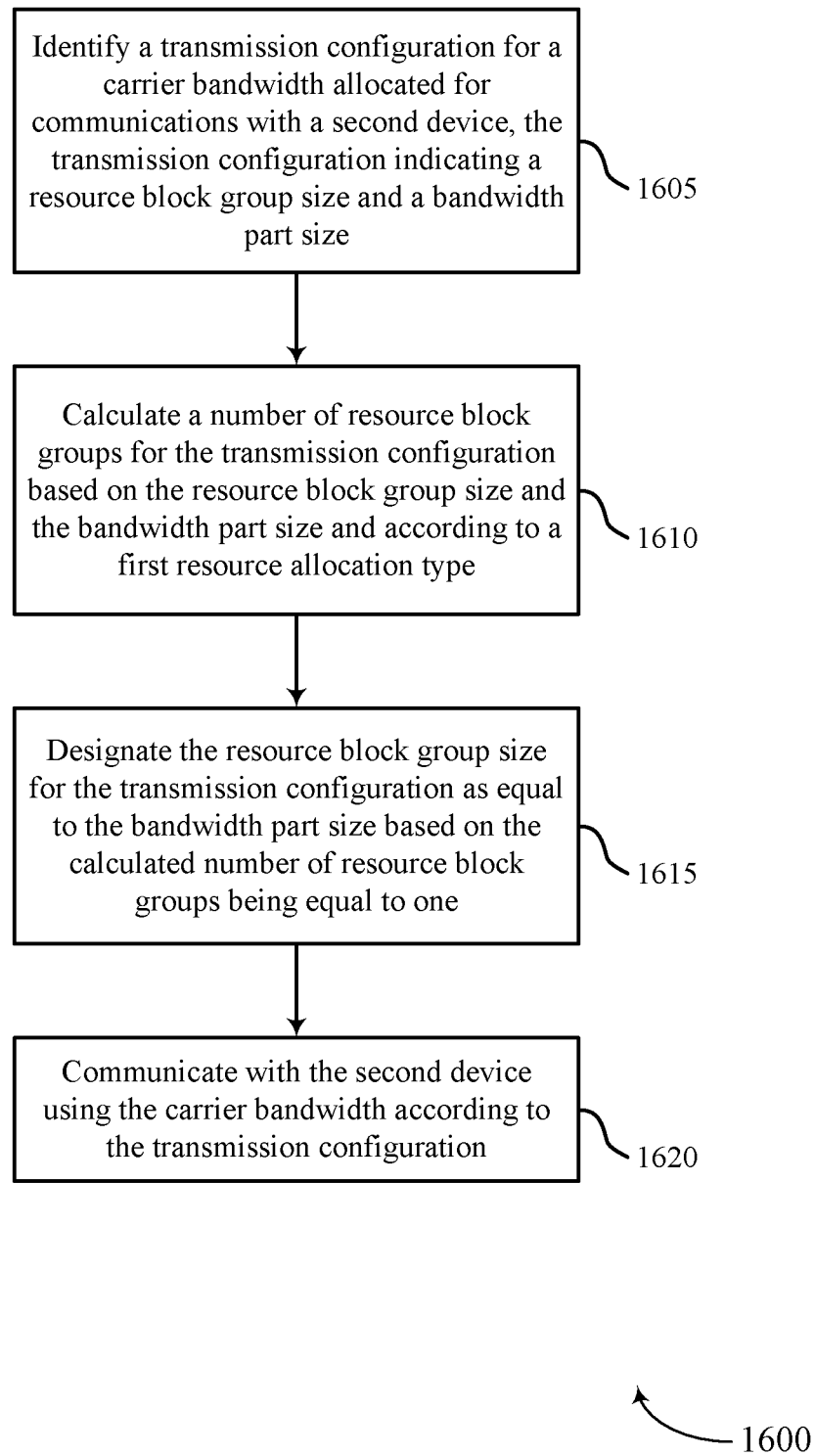

FIG. 16 shows a flowchart illustrating a method 1600 that supports determining transmission configurations for resource block groups and precoding resource block groups in accordance with aspects of the present disclosure. The operations of method 1600 may be implemented by a UE 115 or base station 105 or its components as described herein. For example, the operations of method 1600 may be performed by a communications manager as described with reference to FIGS. 6 through 10. In some examples, a UE or base station may execute a set of instructions to control the functional elements of the UE or base station to perform the functions described herein. Additionally or alternatively, a UE or base station may perform aspects of the functions described herein using special-purpose hardware.

At 1605, the UE or base station may identify a transmission configuration for a carrier bandwidth allocated for communications with a second device, the transmission configuration indicating a resource block group size and a bandwidth part size. The operations of 1605 may be performed according to the methods described herein. In some examples, aspects of the operations of 1605 may be performed by a transmission configuration component as described with reference to FIGS. 6 through 10. Additionally or alternatively, means for performing 1605 may, but not necessarily, include, for example, antenna 925, transceiver 920, communications manager 910, memory 930 (including code 935), processor 940 and/or bus 955.

At 1610, the UE or base station may calculate a number of resource block groups for the transmission configuration based on the resource block group size and the bandwidth part size and according to a first resource allocation type. The operations of 1610 may be performed according to the methods described herein. In some examples, aspects of the operations of 1610 may be performed by a calculation component as described with reference to FIGS. 6 through 10. Additionally or alternatively, means for performing 1610 may, but not necessarily, include, for example, antenna 925, transceiver 920, communications manager 910, memory 930 (including code 935), processor 940 and/or bus 955.

At 1615, the UE or base station may designate the resource block group size for the transmission configuration as equal to the bandwidth part size based on the calculated number of resource block groups being equal to one. The operations of 1615 may be performed according to the methods described herein. In some examples, aspects of the operations of 1615 may be performed by a resource allocation designation component as described with reference to FIGS. 6 through 10. Additionally or alternatively, means for performing 1615 may, but not necessarily, include, for example, antenna 925, transceiver 920, communications manager 910, memory 930 (including code 935), processor 940 and/or bus 955.

At 1620, the UE or base station may communicate with the second device using the carrier bandwidth according to the transmission configuration. The operations of 1620 may be performed according to the methods described herein. In some examples, aspects of the operations of 1620 may be performed by a communication component as described with reference to FIGS. 6 through 10. Additionally or alternatively, means for performing 1620 may, but not necessarily, include, for example, antenna 925, transceiver 920, communications manager 910, memory 930 (including code 935), processor 940 and/or bus 955.

Figure 17:
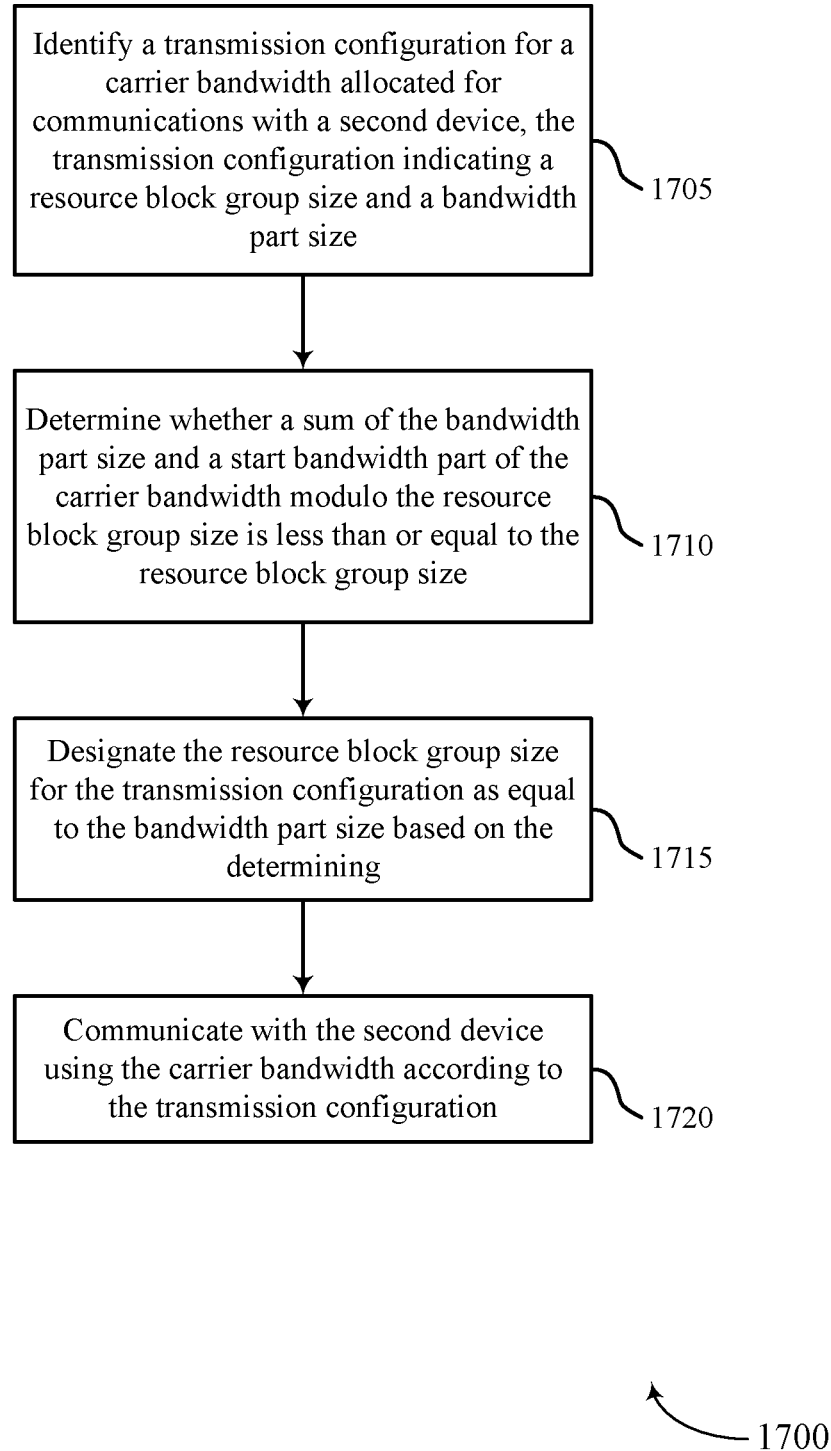

FIG. 17 shows a flowchart illustrating a method 1700 that supports determining transmission configurations for resource block groups and precoding resource block groups in accordance with aspects of the present disclosure. The operations of method 1700 may be implemented by a UE 115 or base station 105 or its components as described herein. For example, the operations of method 1700 may be performed by a communications manager as described with reference to FIGS. 6 through 10. In some examples, a UE or base station may execute a set of instructions to control the functional elements of the UE or base station to perform the functions described herein. Additionally or alternatively, a UE or base station may perform aspects of the functions described herein using special-purpose hardware.

At 1705, the UE or base station may identify a transmission configuration for a carrier bandwidth allocated for communications with a second device, the transmission configuration indicating a resource block group size and a bandwidth part size. The operations of 1705 may be performed according to the methods described herein. In some examples, aspects of the operations of 1705 may be performed by a transmission configuration component as described with reference to FIGS. 6 through 10. Additionally or alternatively, means for performing 1705 may, but not necessarily, include, for example, antenna 925, transceiver 920, communications manager 910, memory 930 (including code 935), processor 940 and/or bus 955.

At 1710, the UE or base station may determine whether a sum of the bandwidth part size and a start bandwidth part of the carrier bandwidth modulo the resource block group size is less than or equal to the resource block group size. The operations of 1710 may be performed according to the methods described herein. In some examples, aspects of the operations of 1710 may be performed by a calculation component as described with reference to FIGS. 6 through 10. Additionally or alternatively, means for performing 1710 may, but not necessarily, include, for example, antenna 925, transceiver 920, communications manager 910, memory 930 (including code 935), processor 940 and/or bus 955.

At 1715, the UE or base station may designate the resource block group size for the transmission configuration as equal to the bandwidth part size based on the determining. The operations of 1715 may be performed according to the methods described herein. In some examples, aspects of the operations of 1715 may be performed by a resource allocation designation component as described with reference to FIGS. 6 through 10. Additionally or alternatively, means for performing 1715 may, but not necessarily, include, for example, antenna 925, transceiver 920, communications manager 910, memory 930 (including code 935), processor 940 and/or bus 955.

At 1720, the UE or base station may communicate with the second device using the carrier bandwidth according to the transmission configuration. The operations of 1720 may be performed according to the methods described herein. In some examples, aspects of the operations of 1720 may be performed by a communication component as described with reference to FIGS. 6 through 10. Additionally or alternatively, means for performing 1720 may, but not necessarily, include, for example, antenna 925, transceiver 920, communications manager 910, memory 930 (including code 935), processor 940 and/or bus 955.

Figure 18:
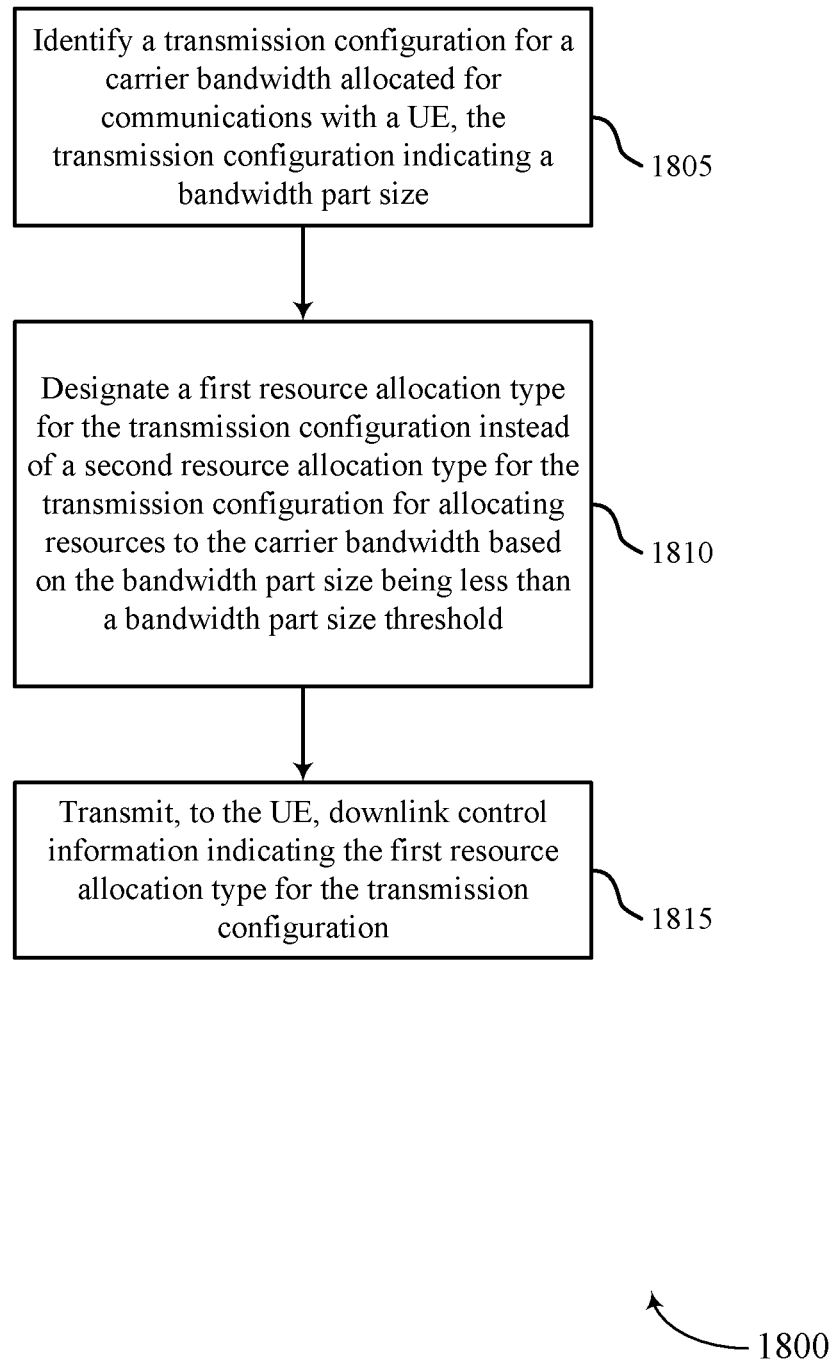

FIG. 18 shows a flowchart illustrating a method 1800 that supports determining transmission configurations for resource block groups and precoding resource block groups in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1805, the base station may identify a transmission configuration for a carrier bandwidth allocated for communications with a UE, the transmission configuration indicating a bandwidth part size. The operations of 1805 may be performed according to the methods described herein. In some examples, aspects of the operations of 1805 may be performed by a transmission configuration component as described with reference to FIGS. 11 through 14. Additionally or alternatively, means for performing 1805 may, but not necessarily, include, for example, antenna 925, transceiver 920, communications manager 910, memory 930 (including code 935), processor 940 and/or bus 955.

At 1810, the base station may designate a first resource allocation type for the transmission configuration instead of a second resource allocation type for the transmission configuration for allocating resources to the carrier bandwidth based on the bandwidth part size being less than or equal to a bandwidth part size threshold. The operations of 1810 may be performed according to the methods described herein. In some examples, aspects of the operations of 1810 may be performed by a resource allocation designation component as described with reference to FIGS. 11 through 14. Additionally or alternatively, means for performing 1810 may, but not necessarily, include, for example, antenna 925, transceiver 920, communications manager 910, memory 930 (including code 935), processor 940 and/or bus 955.

At 1815, the base station may transmit, to the UE, downlink control information indicating the first resource allocation type for the transmission configuration. The operations of 1815 may be performed according to the methods described herein. In some examples, aspects of the operations of 1815 may be performed by a control transmission component as described with reference to FIGS. 11 through 14. Additionally or alternatively, means for performing 1815 may, but not necessarily, include, for example, antenna 925, transceiver 920, communications manager 910, memory 930 (including code 935), processor 940 and/or bus 955.

Figure 19:
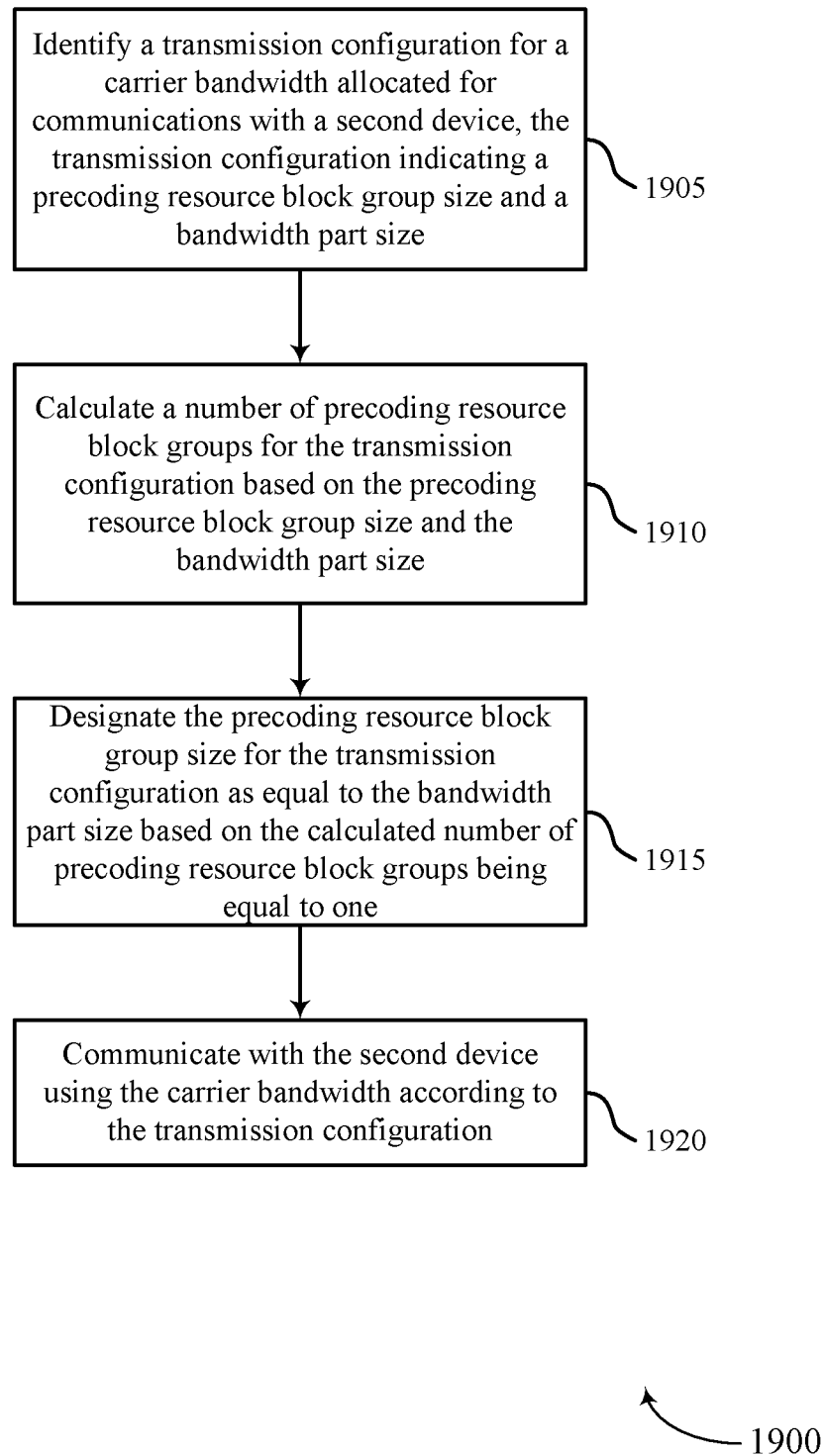

FIG. 19 shows a flowchart illustrating a method 1900 that supports determining transmission configurations for resource block groups and precoding resource block groups in accordance with aspects of the present disclosure. The operations of method 1900 may be implemented by a UE 115 or base station 105 or its components as described herein. For example, the operations of method 1900 may be performed by a communications manager as described with reference to FIGS. 6 through 10. In some examples, a UE or base station may execute a set of instructions to control the functional elements of the UE or base station to perform the functions described herein. Additionally or alternatively, a UE or base station may perform aspects of the functions described herein using special-purpose hardware.

At 1905, the UE or base station may identify a transmission configuration for a carrier bandwidth allocated for communications with a second device, the transmission configuration indicating a precoding resource block group size and a bandwidth part size. The operations of 1905 may be performed according to the methods described herein. In some examples, aspects of the operations of 1905 may be performed by a transmission configuration component as described with reference to FIGS. 6 through 10. Additionally or alternatively, means for performing 1905 may, but not necessarily, include, for example, antenna 925, transceiver 920, communications manager 910, memory 930 (including code 935), processor 940 and/or bus 955.

At 1910, the UE or base station may calculate a number of precoding resource block groups for the transmission configuration based on the precoding resource block group size and the bandwidth part size. The operations of 1910 may be performed according to the methods described herein. In some examples, aspects of the operations of 1910 may be performed by a calculation component as described with reference to FIGS. 6 through 10. Additionally or alternatively, means for performing 1910 may, but not necessarily, include, for example, antenna 925, transceiver 920, communications manager 910, memory 930 (including code 935), processor 940 and/or bus 955.

At 1915, the UE or base station may designate the precoding resource block group size for the transmission configuration as equal to the bandwidth part size based on the calculated number of precoding resource block groups being equal to one. The operations of 1915 may be performed according to the methods described herein. In some examples, aspects of the operations of 1915 may be performed by a resource allocation designation component as described with reference to FIGS. 6 through 10. Additionally or alternatively, means for performing 1915 may, but not necessarily, include, for example, antenna 925, transceiver 920, communications manager 910, memory 930 (including code 935), processor 940 and/or bus 955.

At 1920, the UE or base station may communicate with the second device using the carrier bandwidth according to the transmission configuration. The operations of 1920 may be performed according to the methods described herein. In some examples, aspects of the operations of 1920 may be performed by a communication component as described with reference to FIGS. 6 through 10. Additionally or alternatively, means for performing 1920 may, but not necessarily, include, for example, antenna 925, transceiver 920, communications manager 910, memory 930 (including code 935), processor 940 and/or bus 955.

Figure 20:
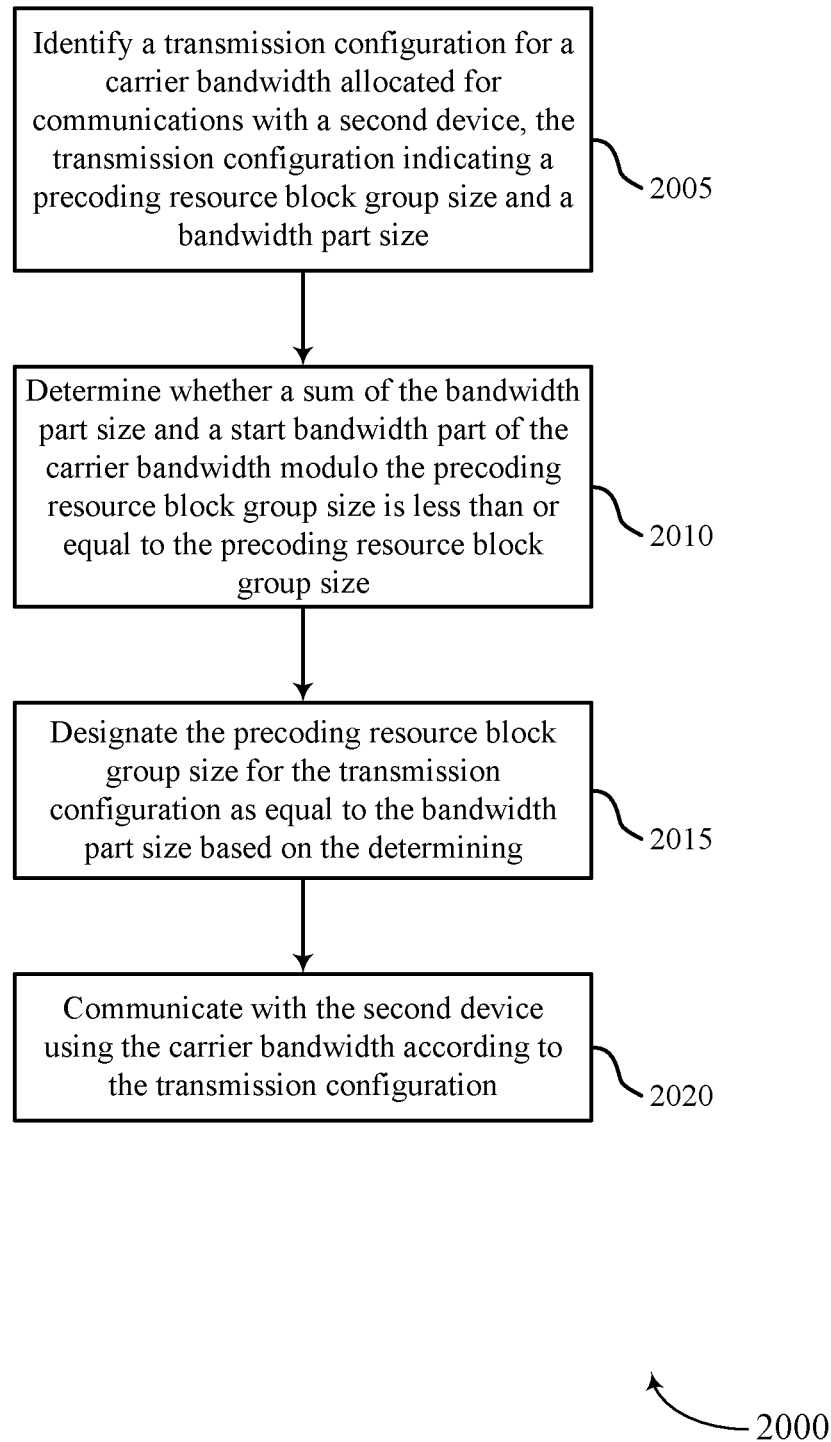

FIG. 20 shows a flowchart illustrating a method 2000 that supports determining transmission configurations for resource block groups and precoding resource block groups in accordance with aspects of the present disclosure. The operations of method 2000 may be implemented by a UE 115 or base station 105 or its components as described herein. For example, the operations of method 2000 may be performed by a communications manager as described with reference to FIGS. 6 through 10. In some examples, a UE or base station may execute a set of instructions to control the functional elements of the UE or base station to perform the functions described herein. Additionally or alternatively, a UE or base station may perform aspects of the functions described herein using special-purpose hardware.

At 2005, the UE or base station may identify a transmission configuration for a carrier bandwidth allocated for communications with a second device, the transmission configuration indicating a precoding resource block group size and a bandwidth part size. The operations of 2005 may be performed according to the methods described herein. In some examples, aspects of the operations of 2005 may be performed by a transmission configuration component as described with reference to FIGS. 6 through 10. Additionally or alternatively, means for performing 2005 may, but not necessarily, include, for example, antenna 925, transceiver 920, communications manager 910, memory 930 (including code 935), processor 940 and/or bus 955.

At 2010, the UE or base station may determine whether a sum of the bandwidth part size and a start bandwidth part of the carrier bandwidth modulo the precoding resource block group size is less than or equal to the precoding resource block group size. The operations of 2010 may be performed according to the methods described herein. In some examples, aspects of the operations of 2010 may be performed by a calculation component as described with reference to FIGS. 6 through 10. Additionally or alternatively, means for performing 2010 may, but not necessarily, include, for example, antenna 925, transceiver 920, communications manager 910, memory 930 (including code 935), processor 940 and/or bus 955.

At 2015, the UE or base station may designate the precoding resource block group size for the transmission configuration as equal to the bandwidth part size based on the determining. The operations of 2015 may be performed according to the methods described herein. In some examples, aspects of the operations of 2015 may be performed by a resource allocation designation component as described with reference to FIGS. 6 through 10. Additionally or alternatively, means for performing 2015 may, but not necessarily, include, for example, antenna 925, transceiver 920, communications manager 910, memory 930 (including code 935), processor 940 and/or bus 955.

At 2020, the UE or base station may communicate with the second device using the carrier bandwidth according to the transmission configuration. The operations of 2020 may be performed according to the methods described herein. In some examples, aspects of the operations of 2020 may be performed by a communication component as described with reference to FIGS. 6 through 10. Additionally or alternatively, means for performing 2020 may, but not necessarily, include, for example, antenna 925, transceiver 920, communications manager 910, memory 930 (including code 935), processor 940 and/or bus 955.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first device, comprising:
   identifying a transmission configuration for a carrier bandwidth allocated for communications with a second device, the transmission configuration indicating a precoding resource block group size and a bandwidth part size;
   calculating a number of precoding resource block groups for the transmission configuration based at least in part on the precoding resource block group size and the bandwidth part size;
   designating the precoding resource block group size for the transmission configuration as equal to the bandwidth part size based at least in part on the calculated number of precoding resource block groups being equal to one; and
   communicating with the second device using the carrier bandwidth according to the transmission configuration.

2. The method of claim 1, wherein calculating the number of precoding resource block groups for the transmission configuration further comprises:

calculating the number of precoding resource block groups for the transmission configuration based at least in part on the precoding resource block group size, the bandwidth part size, and a start precoding resource block of a bandwidth part, wherein the start precoding resource block of the bandwidth part is indicated by the transmission configuration.

3. The method of claim 1, further comprising:
receiving, from a user equipment (UE), a capability indication indicating that the UE is capable of using the transmission configuration.

4. The method of claim 1, further comprising:
identifying the precoding resource block group size of a first precoding resource block group of the carrier bandwidth as a first value; and
identifying the precoding resource block group size of a last precoding resource block group of the carrier bandwidth as a second value, wherein the first precoding resource block group and the last precoding resource block group of the carrier bandwidth comprise a same precoding resource block group and wherein the first value and the second value are different.

5. The method of claim 1, wherein communicating with the second device using the carrier bandwidth according to the transmission configuration comprises:
transmitting, to a user equipment (UE), a transmission comprising resources allocated using the designated precoding resource block group size.

6. The method of claim 1, wherein communicating with the second device using the carrier bandwidth according to the transmission configuration comprises:
transmitting, to a base station, a transmission comprising resources allocated using the designated precoding resource block group size.

7. The method of claim 1, wherein communicating with the second device using the carrier bandwidth according to the transmission configuration comprises:
receiving, at a user equipment (UE), a transmission comprising resources allocated using the designated precoding resource block group size; and
decoding the transmission based at least in part on the designated precoding resource block group size.

8. A method for wireless communications at a first device, comprising:
identifying a transmission configuration for a carrier bandwidth allocated for communications with a second device, the transmission configuration indicating a precoding resource block group size and a bandwidth part size;
determining whether a sum of the bandwidth part size and a start bandwidth part of the carrier bandwidth modulo the precoding resource block group size is less than or equal to the precoding resource block group size;
designating the precoding resource block group size for the transmission configuration as equal to the bandwidth part size based at least in part on the determining; and
communicating with the second device using the carrier bandwidth according to the transmission configuration.

9. The method of claim 8, wherein a start precoding resource block of a bandwidth part is indicated by the transmission configuration.

10. The method of claim 8, further comprising:
receiving, from a user equipment (UE), a capability indication indicating that the UE is capable of using the transmission configuration.

11. The method of claim 8, further comprising:
identifying the precoding resource block group size of a first precoding resource block group of the carrier bandwidth as a first value; and
identifying the precoding resource block group size of a last precoding resource block group of the carrier bandwidth as a second value, wherein the first precoding resource block group and the last precoding resource block group of the carrier bandwidth comprise a same precoding resource block group and wherein the first value and the second value are different.

12. The method of claim 8, wherein communicating with the second device using the carrier bandwidth according to the transmission configuration comprises:
transmitting, to a user equipment (UE), a transmission comprising resources allocated using the designated precoding resource block group size.

13. The method of claim 8, wherein communicating with the second device using the carrier bandwidth according to the transmission configuration comprises:
transmitting, to a base station, a transmission comprising resources allocated using the designated precoding resource block group size.

14. The method of claim 8, wherein communicating with the second device using the carrier bandwidth according to the transmission configuration comprises:
receiving, at a user equipment (UE), a transmission comprising resources allocated using the designated precoding resource block group size; and
decoding the transmission based at least in part on the designated precoding resource block group size.

15. A first device comprising:
a memory;
a transceiver; and
one or more processors, coupled to the memory, configured to:
identify a transmission configuration for a carrier bandwidth allocated for communications with a second device, the transmission configuration indicating a precoding resource block group size and a bandwidth part size;
calculate a number of precoding resource block groups for the transmission configuration based at least in part on the precoding resource block group size and the bandwidth part size;
designate the precoding resource block group size for the transmission configuration as equal to the bandwidth part size based at least in part on the calculated number of precoding resource block groups being equal to one; and
communicate, via the transceiver, with the second device using the carrier bandwidth according to the transmission configuration.

16. The first device of claim 15, wherein to calculate the number of precoding resource block groups for the transmission configuration, the one or more processors are configured to:
calculate the number of precoding resource block groups for the transmission configuration based at least in part on the precoding resource block group size, the bandwidth part size, and a start precoding resource block of a bandwidth part, wherein the start precoding resource block of the bandwidth part is indicated by the transmission configuration.

17. The first device of claim 15, wherein the first device is a base station and the second device is a user equipment (UE) and wherein the one or more processors are further configured to:

receive, via the transceiver, from the UE, a capability indication indicating that the UE is capable of using the transmission configuration.

18. The first device of claim 15, wherein the one or more processors are further configured to:
identify the precoding resource block group size of a first precoding resource block group of the carrier bandwidth as a first value; and
identify the precoding resource block group size of a last precoding resource block group of the carrier bandwidth as a second value, wherein the first precoding resource block group and the last precoding resource block group of the carrier bandwidth comprise a same precoding resource block group and wherein the first value and the second value are different.

19. The first device of claim 15, wherein the first device is a base station and the second device is a user equipment (UE) and wherein to communicate, via the transceiver, with the UE using the carrier bandwidth according to the transmission configuration, the one or more processors are configured to:
transmit, via the transceiver, to the UE, a transmission comprising resources allocated using the designated precoding resource block group size.

20. The first device of claim 15, wherein the first device is a user equipment (UE) and the second device is a base station and wherein to communicate, via the transceiver, with the base station using the carrier bandwidth according to the transmission configuration, the one or more processors are configured to:
transmit, via the transceiver, to the base station, a transmission comprising resources allocated using the designated precoding resource block group size.

21. The first device of claim 15, wherein the first device is a user equipment (UE) and the second device is a base station and wherein to communicate, via the transceiver, with the base station using the carrier bandwidth according to the transmission configuration, the one or more processors are configured to:
receive, via the transceiver, from the base station, a transmission comprising resources allocated using the designated precoding resource block group size; and
decoding the transmission based at least in part on the designated precoding resource block group size.

22. A first device comprising:
a memory;
a transceiver; and
one or more processors, coupled to the memory, configured to:
identify a transmission configuration for a carrier bandwidth allocated for communications with a second device, the transmission configuration indicating a precoding resource block group size and a bandwidth part size;
determine whether a sum of the bandwidth part size and a start bandwidth part of the carrier bandwidth modulo the precoding resource block group size is less than or equal to the precoding resource block group size;
designate the precoding resource block group size for the transmission configuration as equal to the bandwidth part size based at least in part on the sum of the bandwidth part size and the start bandwidth part of the carrier bandwidth modulo the precoding resource block group size being less than or equal to the precoding resource block group size; and communicate, via the transceiver, with the second device using the carrier bandwidth according to the transmission configuration.

23. The first device of claim 22, wherein a start precoding resource block of a bandwidth part is indicated by the transmission configuration.

24. The first device of claim 22, wherein the first device is a base station and the second device is a user equipment (UE) and wherein the one or more processors are further configured to:
receive, via the transceiver, from the UE, a capability indication indicating that the UE is capable of using the transmission configuration.

25. The first device of claim 22, wherein the one or more processors are further configured to:
identify the precoding resource block group size of a first precoding resource block group of the carrier bandwidth as a first value; and
identify the precoding resource block group size of a last precoding resource block group of the carrier bandwidth as a second value, wherein the first precoding resource block group and the last precoding resource block group of the carrier bandwidth comprise a same precoding resource block group and wherein the first value and the second value are different.

26. The first device of claim 22, wherein the first device is a base station and the second device is a user equipment (UE) and wherein to communicate, via the transceiver, with the UE using the carrier bandwidth according to the transmission configuration, the one or more processors are configured to:
transmit, via the transceiver, to the UE, a transmission comprising resources allocated using the designated precoding resource block group size.

27. The first device of claim 22, wherein the first device is a user equipment (UE) and the second device is a base station and wherein to communicate, via the transceiver, with the base station using the carrier bandwidth according to the transmission configuration, the one or more processors are configured to:
transmit, via the transceiver, to the base station, a transmission comprising resources allocated using the designated precoding resource block group size.

28. The first device of claim 22, wherein the first device is a user equipment (UE) and the second device is a base station and wherein to communicate, via the transceiver, with the base station using the carrier bandwidth according to the transmission configuration, the one or more processors are configured to:
receive, via the transceiver, from the base station, a transmission comprising resources allocated using the designated precoding resource block group size; and
decoding the transmission based at least in part on the designated precoding resource block group size.

29. A first device comprising:
means for identifying a transmission configuration for a carrier bandwidth allocated for communications with a second device, the transmission configuration indicating a precoding resource block group size and a bandwidth part size;
means for calculating a number of precoding resource block groups for the transmission configuration based at least in part on the precoding resource block group size and the bandwidth part size;
means for designating the precoding resource block group size for the transmission configuration as equal to the bandwidth part size based at least in part on the calculated number of precoding resource block groups being equal to one; and means for communicating with the second device using the carrier bandwidth according to the transmission configuration.

30. A first device comprising:

means for identifying a transmission configuration for a carrier bandwidth allocated for communications with a second device, the transmission configuration indicating a precoding resource block group size and a bandwidth part size;

means for determining whether a sum of the bandwidth part size and a start bandwidth part of the carrier bandwidth modulo the precoding resource block group size is less than or equal to the precoding resource block group size;

means for designating the precoding resource block group size for the transmission configuration as equal to the bandwidth part size based at least in part on the sum of the bandwidth part size and the start bandwidth part of the carrier bandwidth modulo the precoding resource block group size being less than or equal to the precoding resource block group size; and means for communicating with the second device using the carrier bandwidth according to the transmission configuration.

* * * * *